(12) United States Patent
Nagase et al.

(10) Patent No.: US 10,177,864 B2
(45) Date of Patent: Jan. 8, 2019

(54) INFORMATION PROCESSING APPARATUS, SCREEN DISPLAYING METHOD, AND TRANSMISSION SYSTEM

(71) Applicants: Tatsuya Nagase, Kanagawa (JP); Takahiro Asai, Kanagawa (JP); Yoichiro Matsuno, Kanagawa (JP); Takeshi Homma, Kanagawa (JP)

(72) Inventors: Tatsuya Nagase, Kanagawa (JP); Takahiro Asai, Kanagawa (JP); Yoichiro Matsuno, Kanagawa (JP); Takeshi Homma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/703,707

(22) Filed: Sep. 13, 2017

(65) Prior Publication Data

US 2018/0013503 A1    Jan. 11, 2018

Related U.S. Application Data

(63) Continuation of application No. PCT/JP2016/056292, filed on Mar. 1, 2016.

(30) Foreign Application Priority Data

Mar. 18, 2015 (JP) ................................. 2015-055302

(51) Int. Cl.
*H04B 17/00* (2015.01)
*H04B 17/318* (2015.01)
(Continued)

(52) U.S. Cl.
CPC ............ *H04B 17/318* (2015.01); *G06F 3/14* (2013.01); *G09G 5/00* (2013.01); *H04B 17/23* (2015.01);
(Continued)

(58) Field of Classification Search
CPC ...... H04B 5/0031; H04B 1/3833; H04B 5/02; H04B 17/23; H04B 17/318; H04B 5/0062; H04B 7/145
(Continued)

(56) References Cited

U.S. PATENT DOCUMENTS

| 8,611,840 | B2 | 12/2013 | Kitani et al. | |
| 2010/0167650 | A1* | 7/2010 | Ueda | G06F 3/023 455/41.2 |
| 2012/0019674 | A1* | 1/2012 | Ohnishi | G08C 17/00 348/207.1 |

FOREIGN PATENT DOCUMENTS

| JP | 3-46486 A | 2/1991 |
| JP | 2004-328402 | 11/2004 |

(Continued)

OTHER PUBLICATIONS

International Search Report dated May 24, 2016 in PCT/JP2016/056292 filed on Mar. 1, 2016 (with English Translation).

(Continued)

*Primary Examiner* — Ajibola Akinyemi
(74) *Attorney, Agent, or Firm* — Oblon, McClelland, Maier & Neustadt, L.L.P.

(57) ABSTRACT

An information processing apparatus is provided for communicating with another information processing apparatus in a different site by using at least one of a plurality of communication platforms. The information processing apparatus includes: a receiving unit configured to receive a transmission image that has been transmitted from the another information processing apparatus in the different site; a displaying unit configured to display on a display device the transmission image that has been received by the receiving unit; and a reading unit configured to read an image to be displayed from an image storing unit configured to store the image to be displayed. For at least a certain period while the one of the communication platform is being switched to another one, the displaying unit displays, in place of the transmission image, the image to be displayed that has been read by the reading unit.

13 Claims, 21 Drawing Sheets

(51) Int. Cl.

| | | |
|---|---|---|
| *G06F 3/14* | (2006.01) | |
| *G09G 5/00* | (2006.01) | |
| *H04M 3/56* | (2006.01) | |
| *H04N 7/15* | (2006.01) | |
| *H04N 21/431* | (2011.01) | |
| *H04B 17/23* | (2015.01) | |
| *H04N 5/225* | (2006.01) | |
| *H04W 88/02* | (2009.01) | |
| *H04L 29/08* | (2006.01) | |
| *G06F 13/00* | (2006.01) | |
| *H04M 3/22* | (2006.01) | |
| *H04M 7/12* | (2006.01) | |

(52) U.S. Cl.
CPC .......... *H04L 67/1091* (2013.01); *H04M 3/56* (2013.01); *H04N 5/225* (2013.01); *H04N 7/15* (2013.01); *H04N 21/431* (2013.01); *H04W 88/02* (2013.01); *G06F 13/00* (2013.01); *H04M 3/2227* (2013.01); *H04M 7/1285* (2013.01)

(58) Field of Classification Search
USPC ...................................................... 455/226.2
See application file for complete search history.

(56) References Cited

FOREIGN PATENT DOCUMENTS

| JP | 2006-254002 | 9/2006 |
|---|---|---|
| JP | 2007-036981 | 2/2007 |
| JP | 2008-090651 | 4/2008 |

OTHER PUBLICATIONS

Written Opinion dated May 24, 2016 in PCT/JP2016/056292 filed on Mar. 1, 2016.
Extended European Search Report dated Jun. 1, 2018 in Patent Application No. 16764685.0.

* cited by examiner

INFORMATION PROCESSING APPARATUS, SCREEN DISPLAYING METHOD, AND TRANSMISSION SYSTEM

CROSS-REFERENCE TO RELATED APPLICATIONS

The present application is a continuation application of International Application No. PCT/JP2016/056292, filed Mar. 1, 2016, which claims priority to Japanese Patent Application No. 2015-055302, filed Mar. 18, 2015. The contents of these applications are incorporated herein by reference in their entirety.

BACKGROUND OF THE INVENTION

1. Field of the Invention

The disclosure herein generally relates to an information processing apparatus, a screen displaying method, and a transmission system.

2. Description of the Related Art

Teleconferencing systems are known, as one example of a transmission system for holding a video conference between a plurality of terminals through communication networks such as the Internet. In such teleconferencing systems, one of transmission terminals transmits audio data and image data that are acquired during a teleconference. The other one of the transmission terminals receives the audio data and the image data, and displays the image data on a display and outputs the audio data from a speaker. This enables a teleconference to be held between the transmission terminals.

Now, communication platforms (infrastructure systems and mechanisms for communication) for transmitting audio data and image data between a plurality of transmission terminals are progressively diversified. Therefore, even in a case of holding a teleconference in the same sites, there may be a situation where service providers and users can select any of a plurality of communication platforms.

Thus, a technique of switching the communication platform to a suitable one has been devised (e.g., see Japanese Unexamined Patent Application Publication No. 2008-090651). Japanese Unexamined Patent Application Publication No. 2008-090651 discloses a network system that causes the respective terminals to monitor information exchanges, and that calculates a load for exchanging information from, for example, line speeds or processing capabilities of the respective terminals. When detecting that the load exceeds a threshold, the network system automatically shifts from a P2P (Peer-to-Peer) architecture to a server-client architecture.

In the network system disclosed in Japanese Unexamined Patent Application Publication No. 2008-090651, however, it is not easy for users to understand the situation of a teleconference at the time of switching from one communication platform to another. That is, while a remote communication system such as a teleconferencing system is switching from one communication platform to another, users are not able to communicate with each other. However, the reason why the users are not able to communicate with each other may be caused by a trouble in communication or in a transmission terminal. It is therefore difficult for users to identify the situation of the system being used in the remote communication.

SUMMARY OF THE INVENTION

In one embodiment of the present disclosure, an information processing apparatus for communicating with another information processing apparatus in a different site by using at least one of a plurality of communication platforms, the information processing apparatus includes: a receiving unit configured to receive a transmission image that has been transmitted from the another information processing apparatus in the different site; a displaying unit configured to display on a display device the transmission image that has been received by the receiving unit; and a reading unit configured to read an image to be displayed from an image storing unit configured to store the image to be displayed. For at least a certain period while the one of the communication platform is being switched to another one, the displaying unit displays, in place of the transmission image, the image to be displayed that has been read by the reading unit.

In one or more embodiments, an information processing apparatus that enables users to easily understand the situation of a system at the time of switching a communication platform is provided.

DESCRIPTION OF THE PREFERRED EMBODIMENTS

Hereinafter, one or more embodiments will be described with reference to the accompanying drawings.

Example 1

Figure 1:
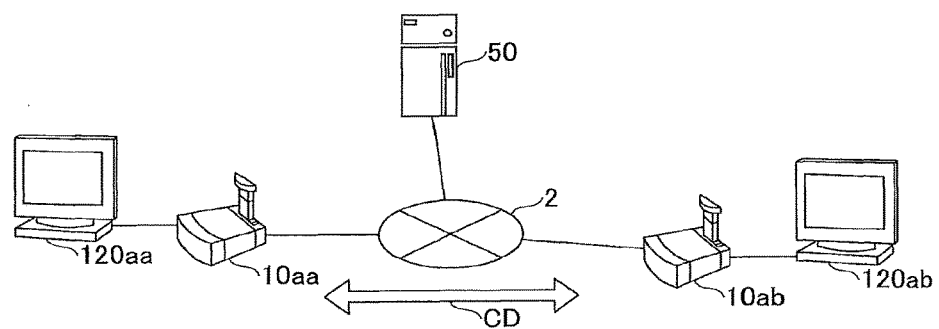
FIG. 1 is one example of a diagram illustrating switching a communication platform.
Figure 2:
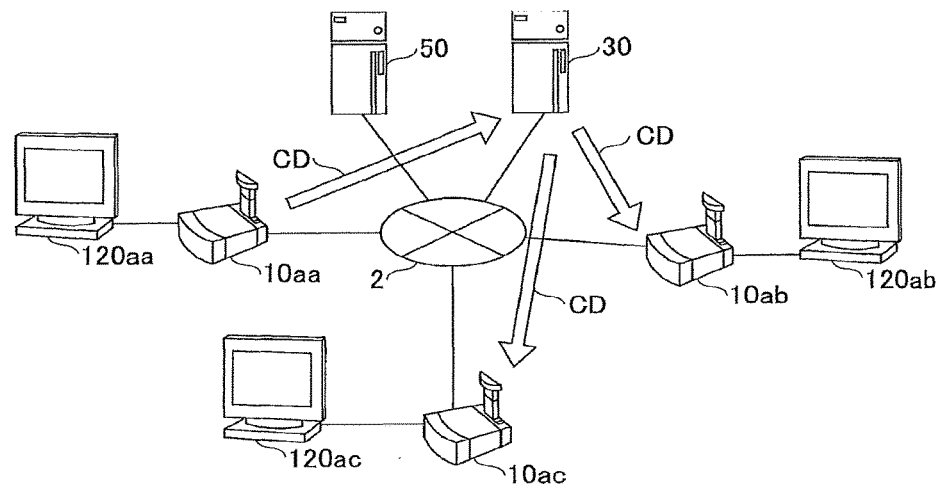
FIG. 2 is one example of a diagram illustrating switching the communication platform.

FIG. 1 and FIG. 2 are examples of diagrams illustrating switching a communication platform in the present example. In FIG. 1, transmission terminals 10*aa* and 10*ab* and a transmission management system 50 are coupled to a communication network 2. The transmission management system 50 informs presences of both of the transmission terminals 10*aa* and 10*ab* to each other (by giving signals) to allow the transmission terminals 10*aa* and 10*ab* to start communication. The transmission terminal 10*aa* communicates with the transmission terminal 10*ab* in a different site, using for example, an API (Application Interface) called WebRTC (Web Real-Time Communication) on a one-to-one (Peer To Peer) communication scheme. The transmission management system 50 is not involved in transmission and reception of content data CD (audio data and image data).

Figure 3:
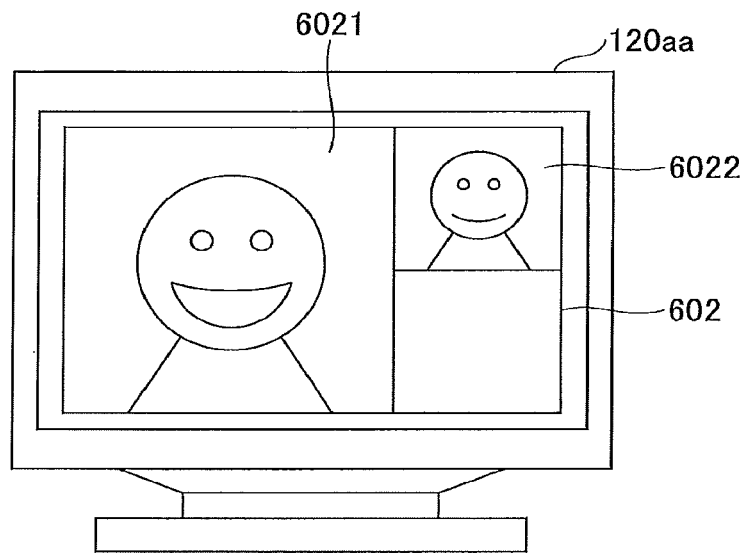
FIG. 3 is one example of a diagram illustrating a switching screen to be displayed on a display coupled to a transmission terminal.
Figure 4:
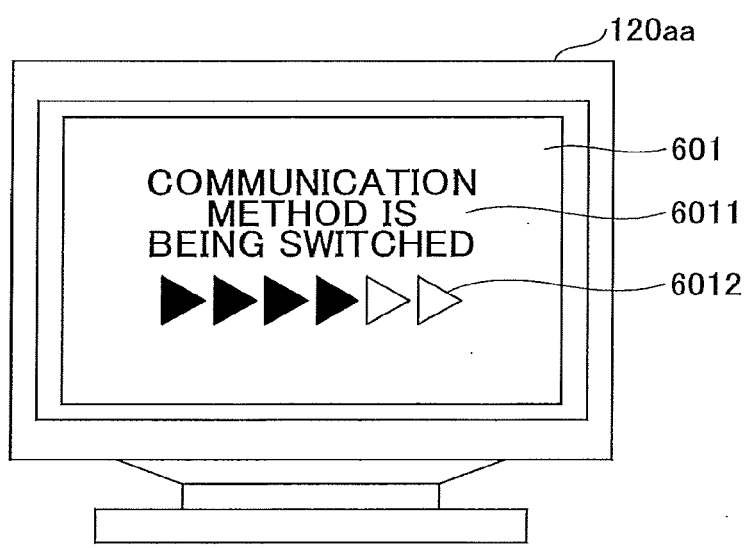
FIG. 4 is one example of a diagram illustrating a switching screen to be displayed on a display coupled to the transmission terminal.
Figure 5:
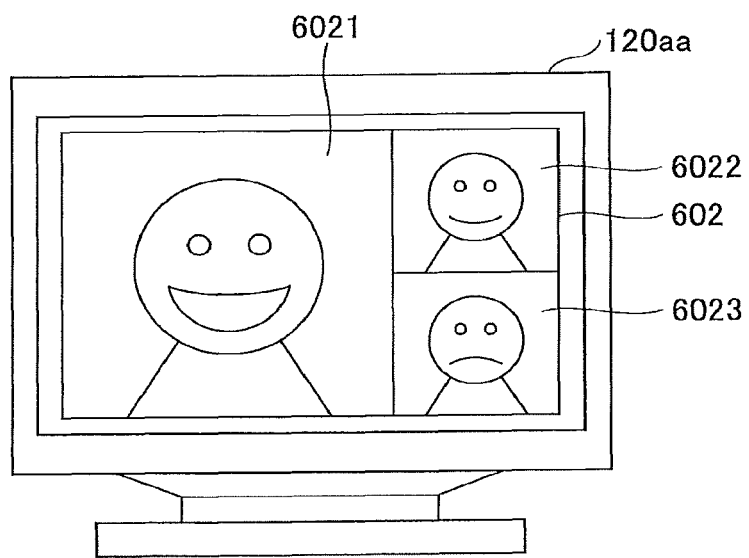
FIG. 5 is one example of a diagram illustrating a switching screen to be displayed on a display coupled to the transmission terminal.

Then, as illustrated in FIG. 3, FIG. 4, and FIG. 5, it is assumed that a transmission terminal 10*ac* has participated in the communication between the transmission terminals 10*aa* and 10*ab*. The transmission management system 50 determines that the communication platform is to be switched to another communication platform (hereinafter, referred to as a communication PF) for establishing communication using a communication standard called H.323, because the number of the terminals participating in a single teleconference becomes three due to the participation of the transmission terminal 10*ac*. That is, the transmission management system 50 switches the current communication PF to another communication PF using a relay apparatus 30, so that the relay apparatus 30 relays the content data CD for communication among the transmission terminals 10*aa*, 10*ab*, and 10*ac*.

In this manner, a transmission system 1 in the present example switches the communication PF to a suitable communication PF in response to a change in the situation, even after the communication starts.

FIG. 3, FIG. 4, and FIG. 5 are each an example of a diagram illustrating a switching screen to be displayed on a display 120*aa* (display device) coupled to the transmission terminal 10*aa*. FIG. 3 illustrates a conference-displaying screen 602 before the communication PF is switched. FIG. 4 illustrates one example of a switching screen 601 while the communication PF is being switched. FIG. 5 illustrates the conference-displaying screen 602 after the communication PF has been switched. Note that a screen displayed on a display 120*ab* is similar.

Before the communication PF is switched, a teleconference is being held between source and destination users at two sites. Hence, on the conference-displaying screen 602 of FIG. 3, an image (transmission image) of a communication destination site is displayed in an area 6021, and an image of a viewer's site is displayed in an area 6022. On a switching screen 601 of FIG. 4, to be displayed when the communication PF starts to be switched, a message 6011 "the communication system is being switched" is displayed, and simultaneously, coloring parts of icons 6012 indicating that the switching is progressing gradually change. After the communication PF is switched, a teleconference is being held among three sites including the viewer's own site. Therefore, on the conference-displaying screen 602 of FIG. 5, an image of a first communication destination site (e.g., the transmission terminal 10*ab*) is displayed in the area 6021, an image of a second communication destination site (e.g., the transmission terminal 10*ac*) is displayed in an area 6022, and an image of the viewer's own site is displayed in an area 6023.

Therefore, in a teleconferencing system in the present example, when the communication PF is switched while a teleconference is being held, the switching screen 601 is displayed on the display 120*aa*. This configuration enables users to understand that the communication PF is being switched.

<Communication PF>

The communication PF to be used in the present example will be described. The communication PF means an infrastructure system or a mechanism for communication obtained by combining one or more of a call control method, a communication path, and a compression technology for audio and video data. For example, in Example of FIG. 1, the communication PF is used such that the API called WebRTC is used for call control to allow the transmission terminals 10 to communicate with each other. In FIG. 2, the communication PF is used such that the transmission terminals 10*aa*, 10*ab*, and 10*ac* are coupled to each other in accordance with the communication standard (including the call control) called H.323 and communicate with each other through the relay apparatus 30. Therefore, in the above-described example, the call control and the communication path have been switched.

In addition, elements that can be a communication PF include, but are not limited to, the following.

Call control . . . (1) H.323 (described above), (2) WebRTC (described above), (3) SIP (Session Initiation Protocol), (4) Expanded protocol of SIP, (5) Protocol for instant messenger, (6) Protocol using MESSAGE method of SIP, (7) Protocol for Internet Relay Chat (IRC (Internet Relay Chat)), and (8) Expanded protocol of the protocol for instant messenger.

Communication path presence or absence of the relay apparatus 30, switching of the relay apparatus 30, switching of a function (interface) in the same relay apparatus 30, and the like.

Video compression method . . . H.264, H.264/AVC, H.264/SVC, H.265/HEVC, MPEG4, and the like.

Audio compression method . . . G.711/G.722, Speex, Opus, iSAC/iLBC, and the like.

Note that an audio compression method and a video compression method may be switched independently, or the audio compression method and the video compression method may be switched in a set. For example, in a case where switching of the call control and the communication path are accompanied with switching of the audio compression method and the video compression method, the audio compression method and the video compression method are switched in a set. In a case where switching of the call control and the communication path are not accompanied with switching of the audio compression method and the video compression method, neither the audio compression method nor the video compression method needs to be switched, or both or one of the audio compression method and the video compression method may be switched. Additionally, regardless of the call control or the communication path, any one of the audio compression method and the video compression method can be switched independently.

Note that the call control, for example, SIP may be classified as a communication protocol of an application layer. Additionally, communication protocols such as RTP (Real-time Transport Protocol), HTTP, HTTPs, TCP/IP, UDP/IP, and the like may also be switched together with switching of the communication PF. These communication protocols to be suitable for the respective types of call control are used. Hence, the communication protocol may be switched together with the call control, or the same communication protocol may be used, even when the call control is switched.

<Configuration Example of Transmission System 1>

Figure 6:
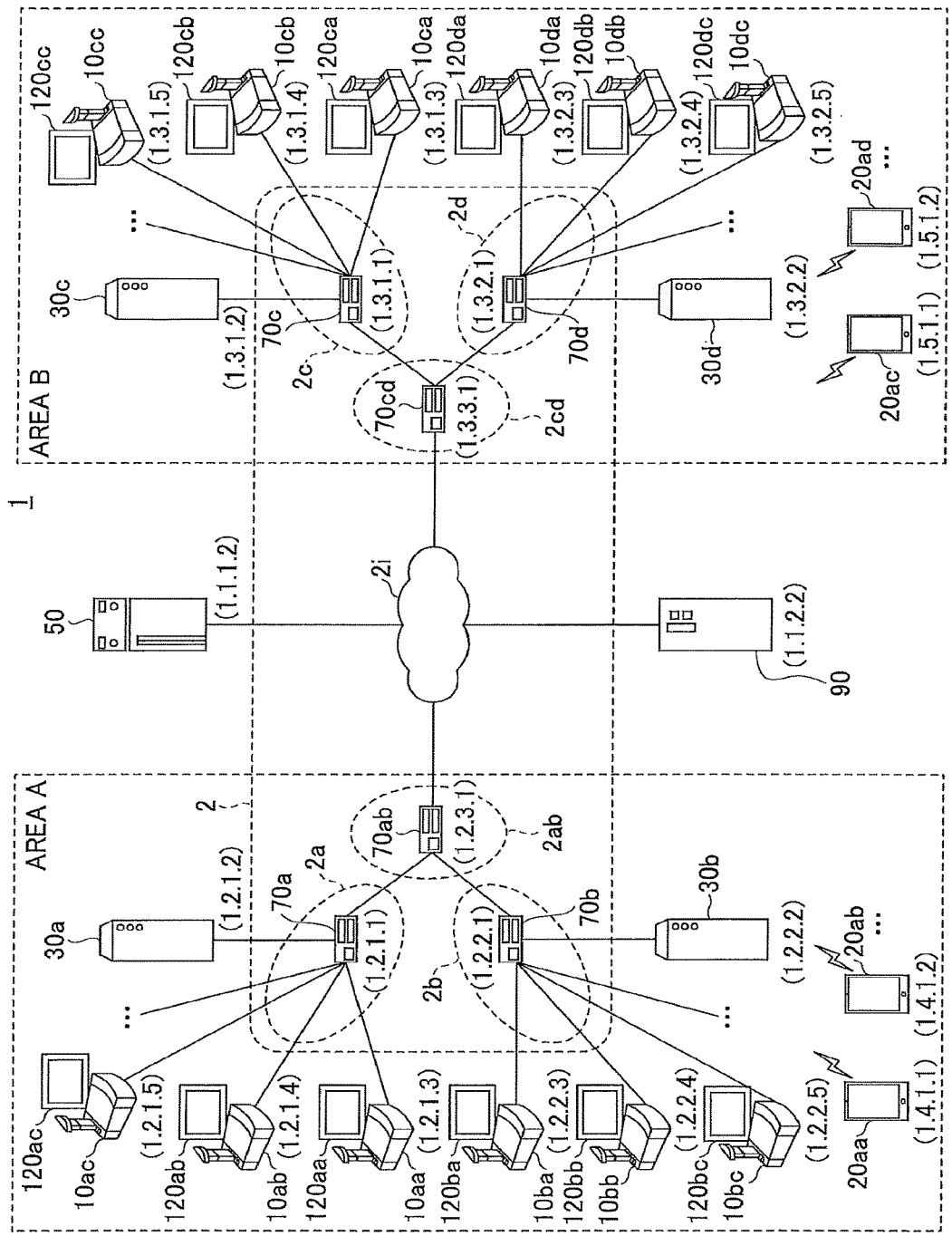
FIG. 6 illustrates a schematic diagram of one example of a transmission system.

FIG. 6 illustrates a schematic diagram of one example of the transmission system 1 in the present example. The transmission system 1 serves as a communication system for communicating information or feelings between a plurality of transmission terminals with each other through the transmission management system 50. Examples of the transmission system 1 may include a teleconferencing system, a TV telephone system, an audio conferencing system, a voice call system, a PC (Personal Computer) screen sharing system, and a text chat system. Additionally, the transmission system 1 includes a data providing system for transmitting content data through the transmission management system 50 in a unidirectional fashion from one transmission terminal to the other transmission terminal.

In the present example, a description will be given of the system that is assumed to enable a teleconference as one example of the communication system.

The transmission system 1 illustrated in FIG. 6 is configured with a plurality of transmission terminals (10aa, 10ab, . . . ), a plurality of mobile terminals (20aa, 20ab, . . . ), displays (120aa, 120ab, . . . ) respectively provided for the transmission terminals (10aa, 10ab, . . . ), a plurality of relay apparatuses (30a, 30b, . . . ), a transmission management system 50, and a program providing system 90.

The plurality of transmission terminals 10 transmit and receive audio data and image data, as one example of content data. That is, the plurality of transmission terminals 10 each serve as a teleconferencing terminal capable of using teleconferencing services. In accordance with the present example, the transmission terminal 10 is assumed to be a terminal special for a teleconference.

On the other hand, a plurality of mobile terminals 20 transmit and receive audio data and image data, as one example of the content data. The mobile terminal 20 may be capable of transmitting and receiving text data. That is, the plurality of mobile terminals 20 may use not only a teleconference but also a text chat. In accordance with the present example, a mobile terminal 20 may be a general-purpose mobile terminal, such as a tablet-type terminal, a cellular phone, a smartphone, a PDA (Personal Digital Assistant), a wearable PC, a game machine, a general-purpose PC terminal, a car navigation terminal, an electronic whiteboard, or a projecting system such as a projector, unless otherwise specified. Note that the mobile terminal 20 is wirelessly coupled to the communication network 2 through, for example, a cellular phone communication network or WiFi (Wireless Fidelity).

As is apparent from a hardware configuration to be described below, the transmission terminal 10 and the mobile terminal 20 are each referred to as an information processing apparatus.

The transmission terminal 10 and the mobile terminal 20 are managed by the transmission management system 50 for managing the call control of the transmission system 1.

Note that in the following description, any transmission terminal of the plurality of transmission terminals (10aa, 10ab, . . . ) is referred to as "transmission terminal 10", and any mobile terminal of the plurality of mobile terminals (20aa, 20ab, . . . ) is referred to as "mobile terminal 20". Similar references may be applied to displays 120, the relay apparatuses 30, and the routers 70.

One of the transmission terminal 10 and the mobile terminal 20, which requests the start of a teleconference to the other one of the transmission terminal 10 and the mobile terminal 20 is referred to as a "request source terminal", whereas a destination terminal that is a requested terminal is referred to as a "destination terminal".

Additionally, in the transmission system 1, between the request source terminal and the destination terminal, a session for management information for transmitting and receiving various types of management information is established through the transmission management system 50. Additionally, a session for transmitting and receiving content data is established through the relay apparatus 30 between the request source terminal and the destination terminal. Note that in the session of the content data, the data is not necessarily traveling through the relay apparatus 30, the request source terminal and the destination terminal may communication with each other through the transmission management system 50, or the request source terminal and the destination terminal may directly communicate with each other.

As described above, the relay apparatus 30 relays the content data between the plurality of transmission terminals 10 and mobile terminals 20.

The transmission management system 50 manages log-in authentication, call situations, and destination lists of the transmission terminals 10 and the mobile terminals 20, informs the relay apparatus 30 of a destination of content data, or causes the relay apparatus 30 to manage the call situations.

In the program providing system 90, an HD (Hard Disk) 304, to be described later, stores terminal programs that enable the transmission terminals 10 and the mobile terminals 20 to achieve various functions, and so that the terminal programs can be transmitted to the transmission terminals 10 and the mobile terminals 20. In the program providing system 90, the HD 304 also stores a transmission management program that enables the transmission management system 50 to achieve various functions, and is capable of transmitting the transmission management program to the transmission management system 50.

The transmission terminals (10aa, 10ab, 10ac . . . ), the relay apparatus 30a, and the router 70a are communicably coupled to each other through the LAN 2a. The transmission terminals (10ba, 10bb, 10bc . . . ), the mobile terminals (20aa, 20ab, . . . ) the relay apparatus 30b, and the router 70b are communicably coupled to each other through the LAN 2b. The LAN 2a and the LAN 2b are communicably coupled to each other through a dedicated line 2ab, which includes the router 70ab. The LAN 2a and the LAN 2b are implemented in a given area A. For example, the area A is located in Japan. The LAN 2a is implemented in an office in Tokyo. The LAN 2b is implemented in an office in Osaka. Additionally, the mobile terminals (20aa, 20ab, . . . ) are used in the area A.

On the other hand, the transmission terminals (10ca, 10cb, 10cc, . . . ), the relay apparatus 30c and the router 70c are communicably coupled to each other through the LAN 2c. The transmission terminals (10da, 10db, 10dc, . . . ), the mobile terminals (20ac, 20ad, . . . ), the relay apparatus 30d, and the router 70d are communicably coupled to each other through the LAN 2d. Additionally, the LAN 2c and the LAN 2d are communicably coupled to each other through a dedicated line 2cd, which includes the router 70cd, and are implemented in a given area B. For example, the area B is located in the United States of America, the LAN 2c is implemented in New York, and the LAN 2d is implemented in Washington D.C. Additionally, the mobile terminals (20ac, 20ad, . . . ) are used in the area B.

Additionally, the transmission management system 50 and the program providing system 90 are communicably coupled through the Internet 2i with the transmission terminals 10, the mobile terminals 20, and the relay apparatuses 30. The transmission management system 50 or the program providing system 90 may be installed in the area A or the area B, or may be installed in any other area than the areas A and B.

Additionally, in FIG. 6, sets of four numbers applied below the transmission terminals 10, the mobile terminals 20, the relay apparatuses 30, the transmission management system 50, the routers 70, and the program providing system 90 simply indicate IP addresses in commonly-used IPv4.

<Hardware Configuration>
<<Transmission Terminal>>

Figure 7:
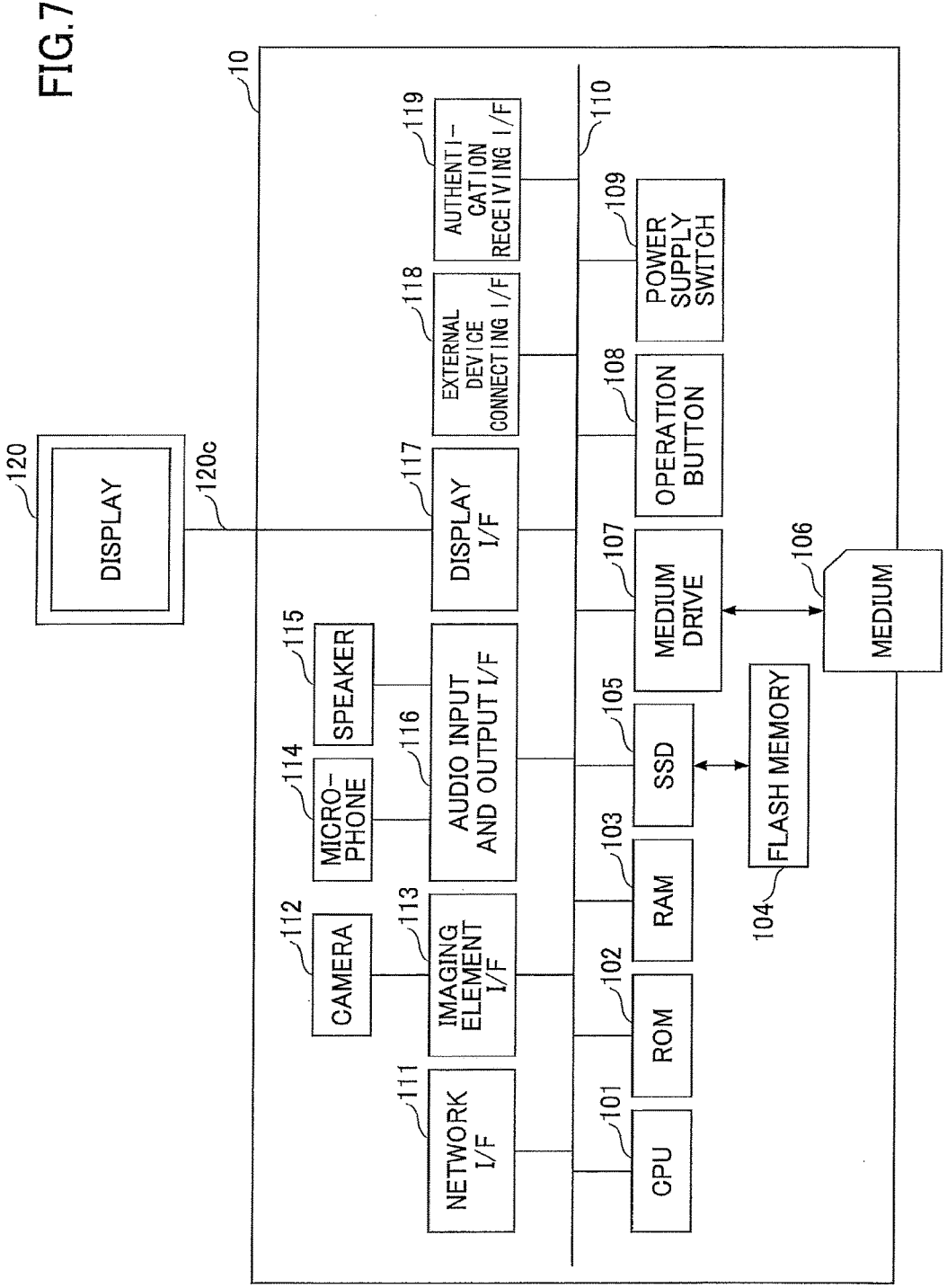
FIG. 7 illustrates one example of a hardware configuration view of a transmission terminal.

Next, using FIG. 7, a hardware configuration of a transmission terminal 10 will be described. FIG. 7 illustrates one example of a hardware configuration diagram of a transmission terminal in the present example. As illustrated in FIG. 7, the transmission terminal 10 in the present example includes a CPU (Central Processing Unit) 101 for controlling operations of the transmission terminal 10 as a whole. The transmission terminal 10 also includes a ROM (Read Only Memory) 102 for storing programs, such as IPL (Initial Program Loader) and the like, used for driving the CPU 101, and a RAM (Random Access Memory) 103 used as a work area of the CPU 101. The transmission terminal 10 also includes a flash memory 104 for storing various data such as audio data and image data, and an SSD (Solid State Drive) 105 for controlling reading or writing various data from or into the flash memory 104 according to control from the CPU 101. The transmission terminal 10 also includes a medium drive 107 for controlling reading or writing data from or into a recording medium 106 such as a flash memory, and an operation button 108 to be operated, for example, in a case where a destination of the transmission terminal 10 is selected. The transmission terminal 10 also includes a power supply switch 109 for switching ON/OFF of the power supply of the transmission terminal 10, and a network I/F (Interface) 111 for data transmission through the communication network 2.

Additionally, the transmission terminal 10 includes a built-in camera 112 for obtaining image data by capturing an image of a subject according to control of CPU 101, an imaging element I/F 113 for controlling driving of the camera 112, and a built-in microphone 114 for inputting audio. The transmission terminal 10 also includes a built-in speaker 115 for outputting audio, and an audio input and output I/F 116 for processing inputs and outputs of audio signals between the microphone 114 and the speaker 115 according to control from the CPU 101. The transmission terminal 10 also includes a display I/F 117 for transmitting image data to an external display 120 according to control from the CPU 101, an external device connecting I/F 118, and an authentication receiving I/F 119. The transmission terminal 10 also includes a bus line 110, such as an address bus or a data bus, for electrically coupling the above-described configuration components with each other, as illustrated in FIG. 7.

The display 120 serves as a displaying unit configured by liquid crystal or organic electroluminescence for displaying images of subjects and icons for operation. Additionally, the display 120 is coupled by a cable 120c to the display I/F 117. The display 120 of the transmission terminal 10 is coupled by the cable 120c to the display I/F 117, but the present example is not limited to this configuration. The display 120 may alternatively be built in the transmission terminal 10.

The external device connecting I/F 118 is capable of being coupled to external devices, such as an external camera, an external microphone, and an external speaker through USB (Universal Serial Bus) cables, respectively.

The authentication receiving I/F 119 serves as an interface for receiving inputs of authentication information from users, and specifically, corresponds to a chip card reader (e.g., NFC (Near field communication)), or a reader such as an SD card or a SIM card.

The hardware configuration of the mobile terminal 20 has the same relevant portion as the hardware configuration of the transmission terminal 10. Even if there is a difference, such a difference is assumed to cause no obstruction in configuring the transmission system 1.

<<Transmission Management System, Relay Apparatus, and Program Providing System>>

Figure 8:
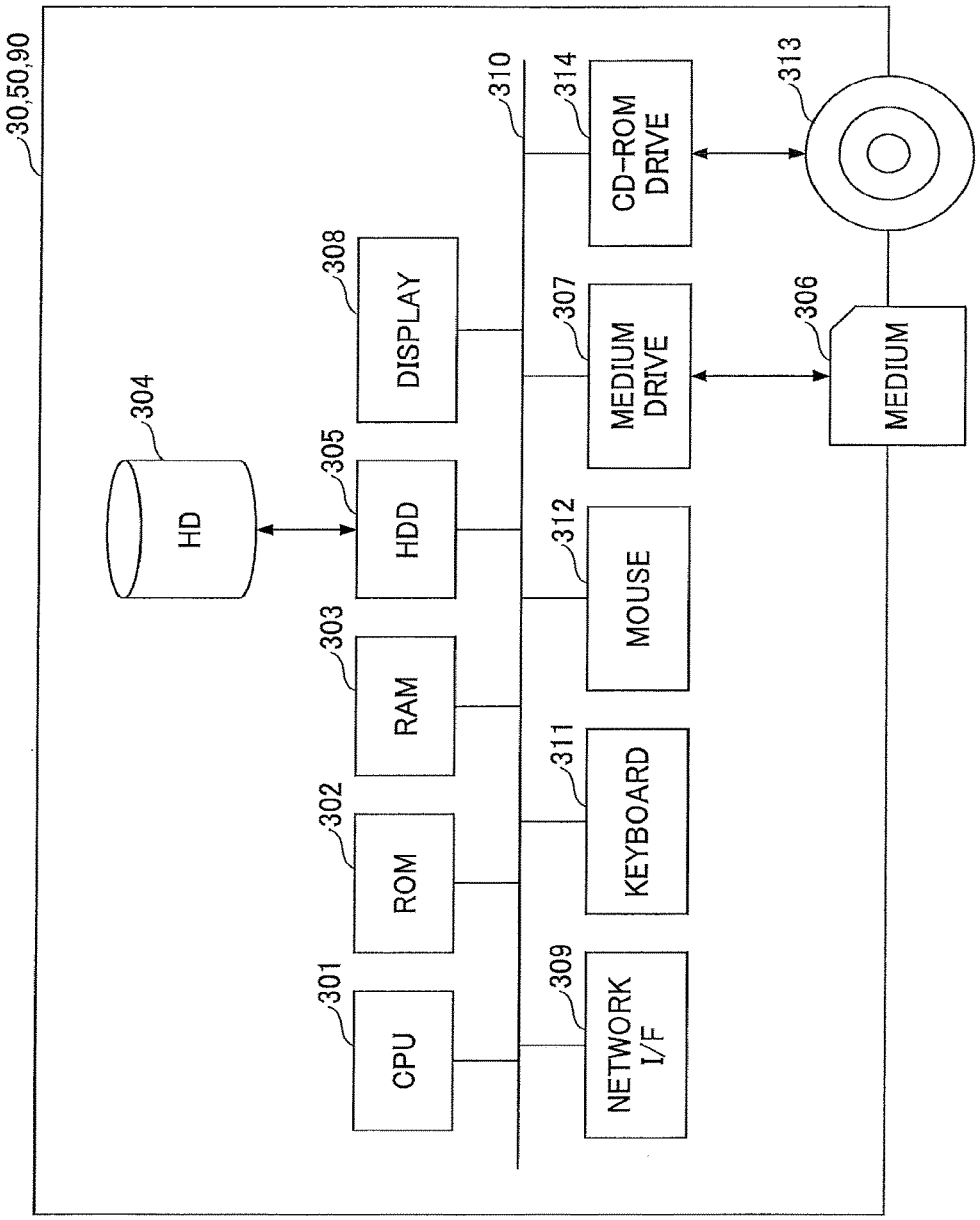
FIG. 8 illustrates one example of a hardware configuration view of a transmission management system.

Next, by using FIG. 8, a hardware configuration of the transmission management system 50 will be described. FIG. 8 illustrates one example of a hardware configuration view of the transmission management system 50 in the present example.

Note that the illustrated hardware configuration of the transmission management system 50, is not necessarily accommodated in one housing, or is not necessarily provided as a group of devices. Hardware-like components suited to be included in the transmission management system 50 are illustrated. In addition, to operate with cloud computing, a physical configuration of the transmission management system 50 or the like in the present example is not necessarily a fixed type, and hardware-like resources may be dynamically coupled or decoupled depending on the load.

The transmission management system 50 includes a CPU 301 for controlling the operation of the transmission management system 50 as a whole, a ROM 302, such as an IPL, for storing programs used for driving of the CPU 301, and a RAM 303 used as a work area of the CPU 301. The transmission management system 50 also includes an HD 304 for storing various data such as the transmission management program, and the like, and an HDD (Hard Disk Drive) 305 for controlling reading or writing various data from or into the HD 304 according to control from the CPU 301. The transmission management system 50 also includes a medium drive 307 for controlling reading or writing (storing) data from or into a recording medium 306 such as a flash memory, and a display 308 for displaying various types of information such as a cursor, a menu, windows, characters, or images. The transmission management system 50 also includes a network I/F 309 for transmitting data through the communication network 2, and a keyboard 311 including a plurality of keys for inputting characters, numbers, various instructions, and the like. The transmission management system 50 also includes a mouse 312 for selecting and executing various instructions, selecting a target to be processed, and moving the cursor. The transmission management system 50 also includes a CD-ROM drive 314 for controlling reading or writing various data from or into a CD-ROM (Compact Disc Read Only Memory) 313, serving as one example of a detachable recording medium. The transmission management system 50 also includes a bus line 310, such as an address bus or a data bus, for electrically coupling the above-described configuration components with each other, as illustrated in FIG. 8.

Additionally, the relay apparatus 30 and the program providing system 90 each have a hardware configuration that is similar to the hardware configuration of the above-described transmission management system 50, and the descriptions will be omitted.

<Functional Configuration>

Figure 9:
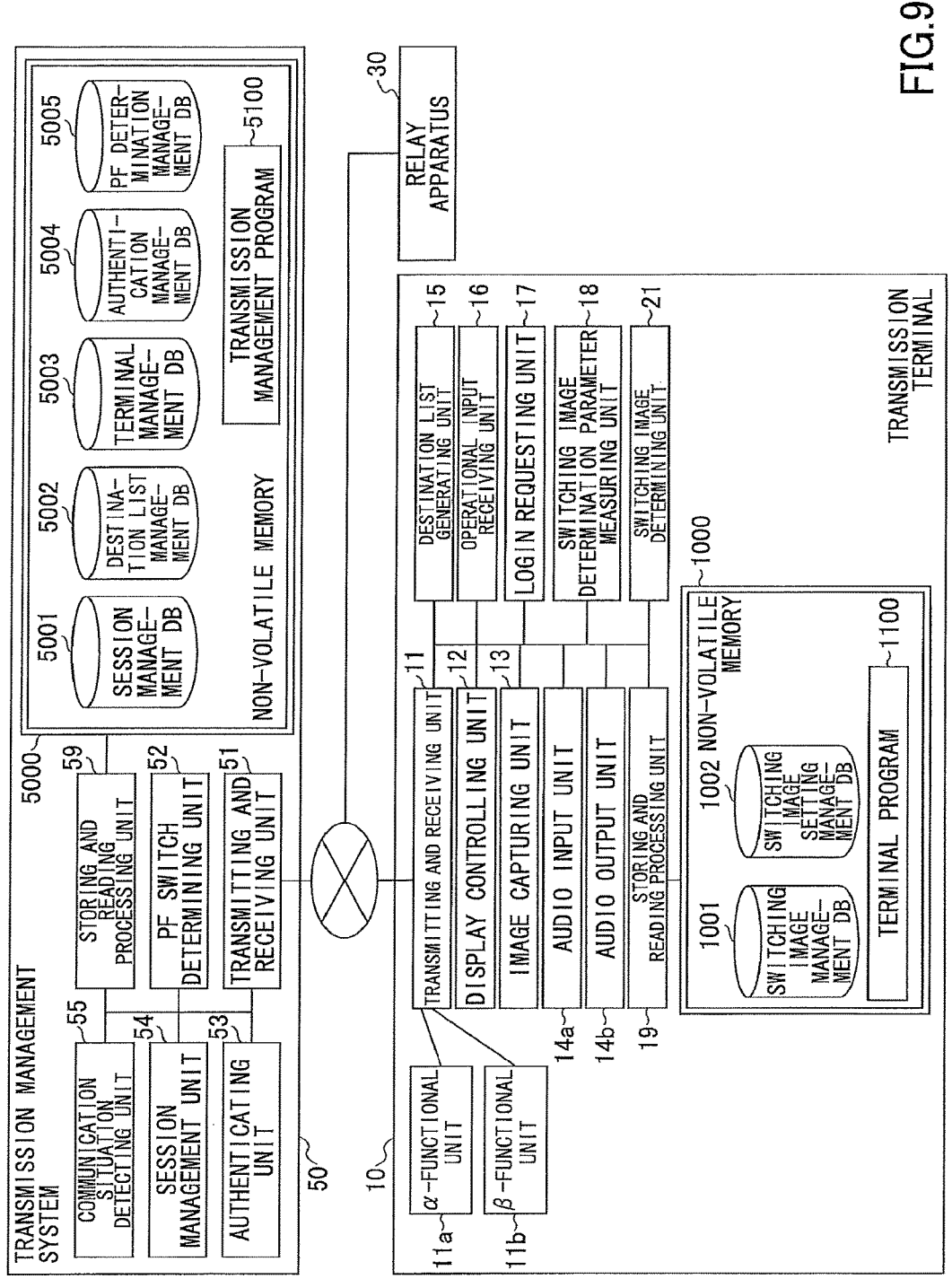
FIG. 9 illustrates one example of functional block diagrams of the transmission terminal and the transmission management system.

Next, using FIG. 9, functional configurations of the transmission terminal 10 and the transmission management system 50 will be described. FIG. 9 illustrates one example of functional block diagrams of the transmission terminal 10 and the transmission management system 50. Note that the program providing system 90 is omitted in FIG. 9, because the program providing system 90 is not directly related in the present example. Additionally, a mobile terminal 20 has almost the same functions as the functions of a transmission terminal 10. Even if there is difference, such a difference is assumed to cause no obstruction in carrying out the present example.

<<Each Functional Configuration of Transmission Terminal>>

The transmission terminal 10 includes a transmitting and receiving unit 11, a display controlling unit 12, an image capturing unit 13, an audio input unit 14a, an audio output unit 14b, a destination list generating unit 15, an operational input receiving unit 16, a login requesting unit 17, a switching image determination parameter measuring unit 18, a switching image determining unit 21, and a storing and reading processing unit 19.

Each of the units included in the transmission terminal 10 serves as a function enabled or a means functioned by any of component elements illustrated in FIG. 7 operating in response to instructions from the CPU 101, according to a terminal program 1100 loaded on the RAM 103 from the flash memory 104.

Additionally, the transmission terminal 10 includes a non-volatile memory 1000 configured with the flash memory 104 illustrated in FIG. 7. Hereinafter, databases implemented in the non-volatile memory 1000 will be described.

TABLE 1

(SWITCHING IMAGE MANAGEMENT TABLE)

| SWITCHING IMAGE NUMBER | FILE NAME |
| --- | --- |
| i_001 | logo.jpg |
| i_002 | logo.mpg |
| i_003 | meeting.jpg |
| i_004 | change.mpeg |
| ... | ... |

In the non-volatile memory 1000, a switching image management DB 1001, which is configured with a switching image management table as illustrated in Table 1, is implemented. In such a switching image management table, a file name is related to a switching image number. The file name serves as a name of a file that stores a switching image. Note that the switching image is one example of an image to be displayed. The switching image is an image to be displayed on the switching screen 601 of FIG. 2, FIG. 3, and FIG. 4. The switching image includes still images (*.jpg) and moving images (*.mpeg). Note that the video images can include moving images with different play periods, promotion videos of musicians, news, advertisements, and the like.

Note that a creator of a switching image is allowed to prepare audio data, in addition to the switching image. Thus, in a case of displaying a moving image, while the switching screen 601 is being displayed, audio such as "currently, a communication system is being switched" can be played by a transmission terminal 10. In a case of displaying a still image, the transmission terminal 10 is enabled to play audio by relating a switching image together to an audio file with a switching image number.

TABLE 2

(SWITCHING IMAGE SETTING MANAGEMENT TABLE)

| MANAGEMENT NUMBER | NETWORK BANDWIDTH | THE NUMBER OF CONFERENCE-PARTICIPATING SITES | ... | SWITCHING IMAGE NUMBER |
| --- | --- | --- | --- | --- |
| c_001 | 1000 kbps OR MORE | 2 | ... | i_001 |
| c_002 | LESS THAN 1000 kbps | 2 | ... | i_002 |
| c_003 | 1000 kbps OR MORE | 3 OR MORE | ... | i_003 |
| c_004 | LESS THAN 1000 kbps | 3 OR MORE | ... | i_004 |
| ... | ... | ... | ... | ... |

In the non-volatile memory 1000, a switching image setting management DB 1002, which is configured with a switching image setting management table as illustrated in Table 2, is implemented. In the switching image setting management table, a condition of which switching image in the switching image management table is selected by a switching image determining unit 21 to be described below is managed. In the switching image setting management table, a network bandwidth (communication bandwidth), the number of sites participating in a conference, and the switching image number are registered in relation to a management number. A still image is related to a broad network bandwidth or a small number of conference-participating sites, whereas a moving image is related to a narrow network bandwidth or a large number of conference-participating sites.

For example, in a case where the network bandwidth in which the transmission terminal 10 communicates is 1000 kbps or more and two sites are participating in a conference, a switching image determining unit 21 to be described below determines to use a switching image having a switching image number i_001. Such determination of the switching image number enables the switching image determining unit 21 to read the switching image from the switching image management table.

Here, the reason why the network bandwidth is listed is that the period needed for switching the communication PF easily varies depending on the network bandwidth. Additionally, the period for establishing a session tends to become longer with an increase in the number of conference-participating sites. Even in a case where the switching period is long, displaying of a moving image makes users easily understand that a problem is not occurring in the communication or in the transmission terminal 10, because in the moving image, some changes are being displayed on the switching screen of the transmission terminal 10. In a case where the switching period is short, the period while a still image is being displayed on the switching screen 601 is also short. Hence, before users start to question whether a problem is occurring, the switching of the communication PF is completed (when a moving image is displayed, displaying of such a moving image will end immediately. This would rather give users an odd feeling). Therefore, a still image or a moving image is changed depending on the network bandwidth and the number of conference-participating sites, so that the transmission terminals 10 are capable of informing users that the communication PF is being switched, in a more suitable manner.

Note that as parameters to determine the switching image in Table 2, the network bandwidth and the number of conference-participating sites are listed. However, the parameters to determine the switching image are not limited to the above-described ones. In addition to them, a parameter to influence (correlate) the period needed for switching the communication PF (such as a load level of the transmission management system 50) may be registered in the switching image setting management table.

Further, the terminal program 1100 is stored in the non-volatile memory 1000. The terminal program 1100 may be delivered from the program providing system 90, and in addition, may be recorded in a computer-readable recording medium such as the above-described recording medium 106 to be distributed in an installable format or an executable format.

(Function of Transmission Terminal)

The transmitting and receiving unit 11 of the transmission terminal 10 is enabled by instructions from the CPU 101 illustrated in FIG. 7 and the network I/F 111 illustrated in FIG. 7. The transmitting and receiving unit 11 transmits and receives various data through the communication network 2 to and from another transmission terminal 10, the transmission management system 50, and the relay apparatus 30.

The transmitting and receiving unit 11 is coupled with an α-functional unit 11a and a β-functional unit 11b. The α-functional unit 11a performs a process needed for an α-communication PF, and the β-functional unit 11b performs a process needed for a β-communication PF. The α-functional unit 11a performs communication using a destination of a global IP address and a port number used in WebRTC, and the β-functional unit 11b performs communication using a destination of an IP address (either the global IP address or the private IP address) of the relay apparatus 30. In a case where communication protocols are different between the α-communication PF and the β-communication PF, the α-functional unit 11a communicates in a communication protocol used for the α-communication PF, and the β-functional unit 11b communicates in a communication protocol used for the β-communication PF. Furthermore, in a case where audio and video compression methods are different between the α-communication PF and the β-communication PF, the α-functional unit 11a compresses audio and video or decompresses the compressed audio and video, in a compression method used for the α-communication PF. The β-functional unit 11b compresses audio and video or decompresses the compressed audio and video, in a compression method used for β-communication PF.

The display controlling unit 12 is enabled by instructions from the CPU 101 illustrated in FIG. 7 and the display I/F 117 illustrated in FIG. 7. The display controlling unit 12 controls transmission (output) of image data to the external display 120.

The image capturing unit 13 is enabled by instructions from the CPU 101 illustrated in FIG. 7, the camera 112, and the imaging element I/F 113. The image capturing unit 13 captures an image of a subject, and outputs image data obtained by capturing the image.

The audio input unit 14a is enabled by instructions from the CPU 101 illustrated in FIG. 7 and the audio input and output I/F 116. After user's voices are converted into audio signals by the microphone 114, the audio input unit 14a receives inputs of audio data related to the audio signals.

The audio output unit 14b is enabled by instructions from the CPU 101 illustrated in FIG. 7 and the audio input and output I/F 116. The audio output unit 14b outputs audio signals related to audio data to the speaker 115, and causes the speaker 115 to output audio.

The destination list generating unit 15 is enabled by instructions from the CPU 101 illustrated in FIG. 7, and creates and updates a destination list based on destination state information that has been received from the transmission management system 50 (an operating state of a transmission terminal 10 and a mobile terminal 20, which are destination candidate terminals).

The operational input receiving unit 16 is enabled by instructions from the CPU 101 illustrated in FIG. 7 and the operation button 108 and the power supply switch 109. The operational input receiving unit 16 receives various inputs from users. For example, when a user turns on the power supply switch 109 illustrated in FIG. 7, the operational input receiving unit 16 receives an instruction for power supply ON, and turns the power supply ON.

The login requesting unit 17 is enabled by instructions from the CPU 101 illustrated in FIG. 7. On receipt of the power supply ON as a trigger, the login requesting unit 17 automatically transmits login request information indicating a login request and an IP address at the present timing of a request source terminal, to the transmission management system 50. Such a trigger may be a user's authentication operation. Additionally, at the time of transmission, the transmitting and receiving unit 11 transmits the login request information and the IP address through the communication network 2.

The switching image determination parameter measuring unit 18 measures parameters for the switching image determining unit 21 to select a switching image. The parameters, for example, include the network bandwidth and the number of conference-participating sites.

The switching image determining unit 21 is enabled by instructions from the CPU 101 illustrated in FIG. 7. At the time of switching the communication PF, from the start to the end of the switching, the switching image determining unit 21 determines a switching image to be displayed on the display 120 of the transmission terminal 10.

The storing and reading processing unit 19 is enabled by instructions from the CPU 101 illustrated in FIG. 7 and the SSD 105 illustrated in FIG. 7. The storing and reading processing unit 19 performs processes of storing various data in the non-volatile memory 1000 and reading various data stored in the non-volatile memory 1000. In the non-volatile memory 1000, a communication ID (Identification) for identifying the transmission terminal 10 or a user, as a communication destination, type identification information (information indicating differences between a transmission terminal 10 and a mobile terminal 20), a password, and the like are stored. Note that the communication ID and the password are not necessarily stored in the non-volatile memory 1000. For example, whenever a user makes a login request for the transmission management system 50, the user may input the communication ID and the password.

Note that the communication ID in the present example indicates identification information, to be used for uniquely identifying each of the transmission terminals or each of the users who use the transmission terminals, such as languages, characters, codes, or marks. Additionally, the communication ID and the relay apparatus ID may be identification information including a combination of at least two of the languages, characters, codes, and marks.

<<Functional Configuration of Transmission Management System>>

The transmission management system 50 includes a transmitting and receiving unit 51, a PF switch determining unit 52, an authenticating unit 53, a session management unit 54, a communication situation detecting unit 55, and a storing and reading processing unit 59. Each of the above-described units serves as a function enabled or a means functioned by any of component elements illustrated in FIG. 8 operating in response to instructions from the CPU 301 according to being loaded on the RAM 303 from the HD 304. Additionally, the transmission management system 50 includes a non-volatile memory 5000 that maintains memory of various data (or information), even when the transmission management system 50 is powered off. Such a non-volatile memory 5000 is implemented by an HD 304 illustrated in FIG. 8.

In the non-volatile memory 5000, a session management DB 5001, which is configured with a session management table as illustrated in Table 3, is implemented. In such a session management table, for every session ID used for establishing a session for selecting a relay apparatus 30, a communication PF, a relay apparatus ID of a relay apparatus 30 used for relaying data, a communication ID of a request source terminal, a communication ID of a destination terminal, and a conference ID are managed in relation to each other. Note that in a case where the relay apparatus 30 is not used, nothing is registered as the relay apparatus ID.

TABLE 4

(DESTINATION LIST MANAGEMENT TABLE)

| COMMUNICATION ID | COMMUNICATION ID OF DESTINATION CANDIDATE TERMINAL |
|---|---|
| 01aa | 01ab, 01ac, 02ab, 02ac, 02ad |
| 01ab | 01aa, 01ac, 02ab, 02ac, 02ad |
| 01ac | 01aa, 01ab, 02ab, 02ac, 02ad |
| 02ab | 01aa, 01ab, 01ac, 02ac, 02ad |
| 02ac | 01aa, 01ab, 01ac, 02ab, 02ad |
| 02ad | 01aa, 01ab, 01ac, 02ab, 02ac |

In the non-volatile memory 5000, a destination list management DB 5002, which is configured with a destination list management table that manages destination information as illustrated in Table 4, is implemented. In the destination list management table, communication IDs of all destination candidate terminals including the transmission terminals 10 and the mobile terminals 20 are managed in relation to a communication ID of a request source terminal that requests starting of a connection (a call) in a teleconference. The communication ID of such a destination candidate terminal includes communication IDs of the transmission terminals 10 or the mobile terminals 20, with which a request source terminal starts communication.

TABLE 5

(TERMINAL MANAGEMENT TABLE)

| COMMUNICATION ID | OPERATING STATE | NAME | IP ADDRESS |
|---|---|---|---|
| 01aa | ONLINE | HEAD OFFICE | 1.2.1.3 |
| 01ab | ONLINE | TOKYO OFFICE | 1.2.1.4 |
| 01ac | OFFLINE | OSAKA OFFICE | 1.2.1.5 |
| 02ab | ONLINE | YAMADA Taro | 1.4.1.2 |
| 02ac | ONLINE | SATO Jiro | 1.5.1.1 |
| 02ad | OFFLINE | Ito Saburo | 1.5.1.2 |

In the non-volatile memory 5000, a terminal management DB 5003, which is configured with a terminal management table as illustrated in Table 5, is implemented. In such a terminal management table, for each of the communication IDs of the transmission terminals 10, an operating state of

TABLE 3

(SESSION MANAGEMENT TABLE)

| SESSION ID | COMMUNICATION PF | RELAY APPARATUS ID | REQUEST SOURCE COMMUNICATION ID | DESTINATION COMMUNICATION ID | CONFERENCE ID |
|---|---|---|---|---|---|
| se1 | α | — | 01aa | 01ab | k001 |
| ... | ... | ... | ... | ... | ... | each transmission terminal, a name used when each communication ID is a destination, and an IP address of each transmission terminal are managed in relation to each other.

TABLE 6

(AUTHENTICATION MANAGEMENT TABLE)

| COMMUNICATION ID | PASSWORD |
|---|---|
| 01aa | aaaa |
| 01ab | abab |
| 01ac | acac |
| 02ab | ABAB |
| 02ac | ACAC |
| 02ad | ADAD |

In the non-volatile memory 5000, an authentication management DB 5004, which is configured with an authentication management table as illustrated in Table 6, is implemented. In such an authentication management table, each communication ID of a transmission terminal 10 or a user is managed in relation to a password of the transmission terminal 10 or the user.

TABLE 7

(PF DETERMINATION TABLE)

| THE NUMBER OF SITES | COMMUNICATION PLATFORM |
|---|---|
| 2 | α (WebRTC) |
| 3 OR MORE | β (VIA RELAY APPARATUS) |

In the non-volatile memory 5000, a PF determination management DB 5005, which is configured with a PF determination table as illustrated in Table 7, is implemented. In such a PF determination table, each communication PF is managed in relation to the number of sites. In the present example, the α-communication PF means communication using WebRTC, and the β-communication PF means communication through the relay apparatus 30 (communication with call control using H.323).

Additionally, a transmission management program 5100 is stored in the non-volatile memory 5000. The transmission management program 5100 is provided by the program providing system 90. Further, the transmission management program 5100 may be recorded in a computer-readable recording medium such as the above-described recording medium 306 or the CD-ROM 313 to be distributed in an installable format or an executable format.

<<Each Functional Configuration of Transmission Management System>>

Next, each functional configuration of the transmission management system 50 will be described in detail. The transmitting and receiving unit 51 is enabled by instructions from the CPU 301 illustrated in FIG. 8 and the network I/F 309 illustrated in FIG. 8. The transmitting and receiving unit 51 transmits or receives various data (or information) to or from the transmission terminal 10 and the relay apparatus 30 through the communication network 2.

The authenticating unit 53 is enabled by instructions from the CPU 301 illustrated in FIG. 8. The authenticating unit 53 authenticates the transmission terminal 10 or the user according to whether a combination of a communication ID and a password included in login request information that has been received through the transmitting and receiving unit 51 matches the communication ID and the password registered in the authentication management DB 5004. Note that the authentication method is not limited to this, and may be performed by using a Client Certificate (an authentication method using a public key and a private key).

The session management unit 54 is enabled by instructions from the CPU 301 illustrated in FIG. 8. When the session management unit 54 is requested for a connection to a destination terminal by a transmission terminal 10, which has been authenticated by the authenticating unit 53 (when the session management unit 54 acquires start request information), the session management unit 54 manages in a session management DB 5001, a communication PF, a relay apparatus ID of a relay apparatus 30 for relaying content data (in a case where the relay apparatus 30 relays the content data), a session ID, a communication ID of a request source terminal, a communication ID of a destination terminal, and a conference ID, in relation to each other. Note that the session management unit 54 establishes a session suitable for each communication PF, but the details will be described below.

The communication situation detecting unit 55 is enabled by instructions from the CPU 301 illustrated in FIG. 8. The communication situation detecting unit 55 detects a communication situation between transmission terminals 10 and a communication situation between a transmission terminal 10 and the transmission management system 50. As one example of the communication situation in the present example, a network bandwidth and the number of sites (the number of conference-participating sites) can be given.

The PF switch determining unit 52 is enabled by instructions from the CPU 301 illustrated in FIG. 8, and selects (determines) a communication PF suitable for the communication situation, by referring to the PF determination table. The determination of the communication PF and the switching determination will be described later in detail. In a case of determining to switch the communication PF, the PF switch determining unit 52 informs the session management unit 54 of a post-switching communication PF, and requests a session establishment.

The storing and reading processing unit 59 is enabled by instructions from CPU 301 illustrated in FIG. 8 and the HDD 305 illustrated in FIG. 8. The storing and reading processing unit 59 performs processes of storing various data in the non-volatile memory 5000 and reading various data stored in the non-volatile memory 5000.

<<Regarding Establishment of Session Corresponding to Communication PF>>

First, the establishment of a session for WebRTC used on the α-communication PF will be briefly described. In WebRTC, for example, browsers (or applications having similar functions) communicate with each other without the intervention of a server. However, as processing (signaling) for identifying a communication destination is needed, the transmission management system 50, through use of operating states of transmission terminals 10 being managed in the terminal management table, permits one user to identify the other user, which is the communication destination of such one user. For example, on a destination list screen to be described later, a destination user can be identified. When the session management unit 54 is capable of identifying two transmission terminals 10 for communicating with each other, the session management unit 54 functions as a STUN server. Then, the session management unit 54 informs the transmission terminals 10aa and 10ab of an external global IP address of a NAT (Network Address Translation) apparatus and a port number, the NAT apparatus belonging to a company internal network or an in-home network where the transmission terminal 10, which is the communication destination, is located. The transmission terminals 10aa and 10ab become capable of communicating with each other on a one-to-one basis through the NAT apparatus, because the transmission terminals 10aa and 10ab learn the global IP addresses and the port number of each other.

Next, the establishment of the session used on the β-communication PF will be briefly described. Processing is the same until the operating states of the transmission terminals 10 that have logged in to the transmission management system 50 are managed in the terminal management table. Subsequently, for example, when a user of the transmission terminal 10aa informs the transmission management system 50 of the transmission terminal 10ab as a communication destination, the session management unit 54 selects a suitable relay apparatus 30. Various methods are conceivably available for how to select the relay apparatus 30, but in the present example, a delay time in transmission from the relay apparatus 30 to the transmission terminal 10 is considered.

When the session management unit 54 determines the relay apparatus 30, communication IDs of the transmission terminals 10aa and 10ab for communicating with each other on a single teleconference are informed to the relay apparatus 30. The session management unit 54 or the relay apparatus 30 assigns a session ID and a conference ID for the teleconference for the transmission terminals 10aa and 10ab, which are terminals for participating in the same conference. Additionally, the session management unit 54 informs the transmission terminals 10aa and 10ab of the IP address of the relay apparatus 30. When the transmission terminals 10aa and 10ab are respectively coupled to the relay apparatus 30 together with the communication IDs, the relay apparatus 30 relays content data to the transmission terminals 10aa and 10ab participating in the same teleconference, according to the communication IDs.

<Communication Processing of Transmission Terminal 10>

Figure 10:
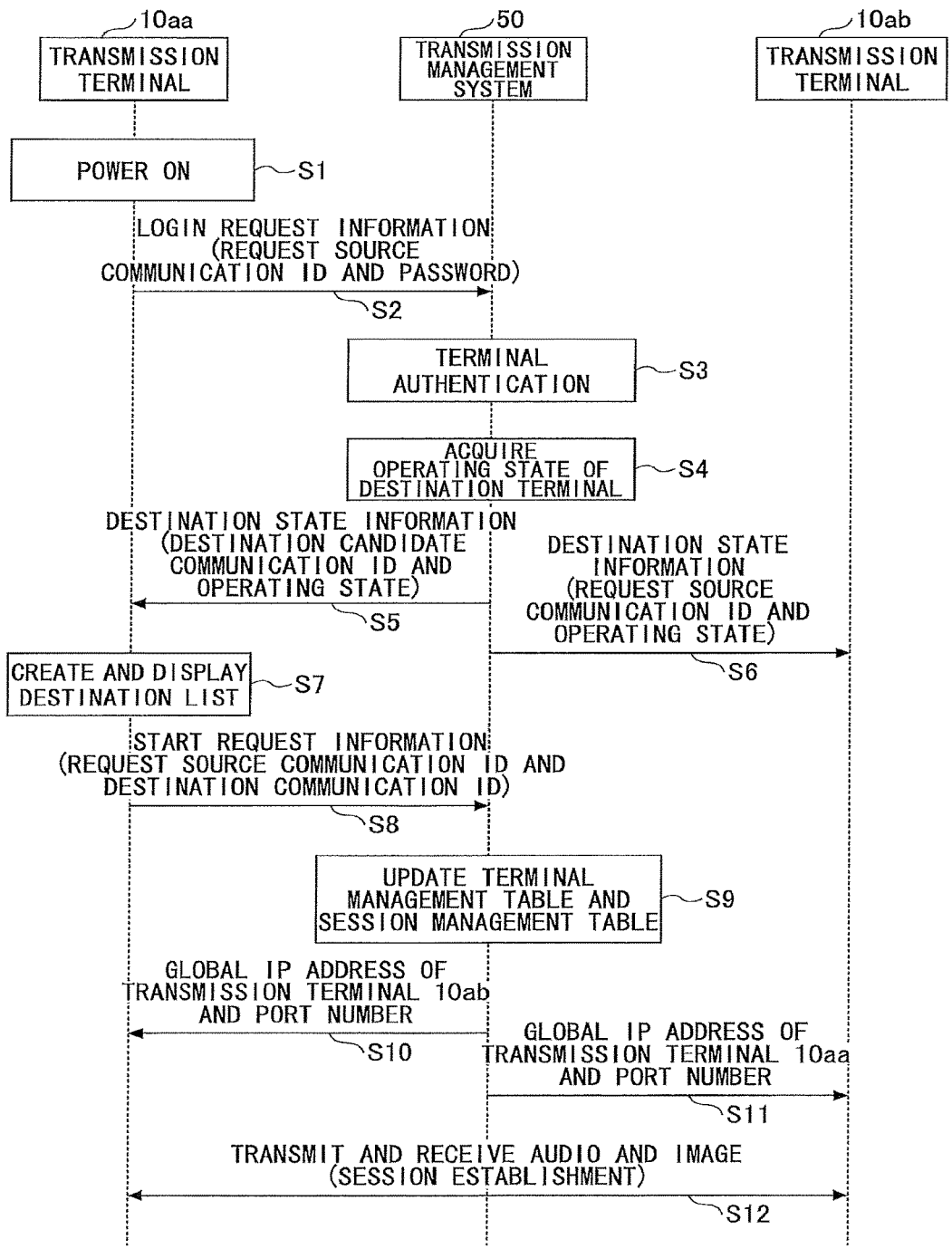
FIG. 10 is one example of a sequence chart illustrating a procedure by which transmission terminals 10aa and 10ab establish a session.

A procedure by which the transmission terminals 10aa and 10ab establish a session will be described by using FIG. 10. FIG. 10 is one example of a sequence chart illustrating a procedure by which the transmission terminals 10aa and 10ab establish a session. Note that in the present example, in a case where two transmission terminals 10 start a teleconference, the α-communication PF is to be used. However, in a case where, for example, three or more users are scheduled to perform a teleconference, a teleconference may be started on a communication PF specified by a user, so that the transmission system 1 starts its operation. The user is able to specify the β-communication PF for the communication PF to the transmission management system 50, and is able to start a teleconference on the β-communication PF.

S1: When a user turns ON the power supply switch 109, the operational input receiving unit 16 receives a power ON instruction, and turns ON the power.

S2: Upon a trigger of the turning ON the power, the login requesting unit 17 automatically transmits login request information indicating a login request to the transmission management system 50 from the transmitting and receiving unit 11 through the communication network 2. Such a login request can be transmitted not only at the timing of turning ON the power but also at any timing operated by a user. The login request information includes a communication ID for identifying a transmission terminal 10aa, which is a request source, and a password. Note that in a case where the login request information is transmitted from the transmission terminal 10aa to the transmission management system 50, the transmission management system 50, which is a receiving side, is capable of learning an IP address (global IP address) of the transmission terminal 10aa.

S3: The authenticating unit 53 of the transmission management system 50 performs authentication by determining whether the communication ID and the password managed in the identification management table are identical to the communication ID and the password included in the login request information that has been received through the transmitting and receiving unit 51.

S4: When the authenticating unit 53 is successful in authenticating the transmission terminal 10aa, the session management unit 54 reads a communication ID of a destination terminal that is a destination candidate terminal of the transmission terminal 10aa from the destination management table, and reads an operating state of the destination terminal from the terminal management table. In this process, the transmission terminal 10ab, which is a destination terminal, is assumed to be online.

S5: Then, the transmitting and receiving unit 51 transmits destination state information including the communication ID and the operating state of each of the destination candidate terminals, through the communication network 2 to the transmission terminal 10aa. The destination state information includes names registered in the terminal management table. Accordingly, the transmission terminal 10aa is capable of learning the operating state at the present timing of the transmission terminal 10ab, included in a destination list, capable of communicating with the transmission terminal 10aa.

S6: Note that the transmitting and receiving unit 51 transmits the communication ID and the operating state of the transmission terminal 10aa that has issued the login request to a transmission terminal (here, the transmission terminal 10ab) with the transmission terminal 10aa included in the destination list. Accordingly, the transmission terminals 10 as destination candidate terminals registered in the destination list are capable of learning the operating state of each other.

S7: The destination list generating unit 15 of the transmission terminal 10aa, upon receipt of the destination state information, creates a destination list and causes the display 120 to display the destination list. The user of the transmission terminal 10aa is able to select a communication ID for requesting a start of communication from a destination list screen. In the present example, it is assumed that the transmission terminal 10ab is selected.

S8: When the user selects the destination and requests the start of communication, the transmitting and receiving unit 11 of the transmission terminal 10aa transmits start request information to the transmission management system 50. The start request information includes a request source communication ID and a destination communication ID. Accordingly, the transmitting and receiving unit 51 of the transmission management system 50 is capable of learning the IP address of the request source terminal 10aa.

S9: The session management unit 54 of the transmission management system 50 performs a process for establishing a session. That is, the session management unit 54 registers a session ID, a communication PF, a request source communication ID, a destination communication ID, and a conference ID, in a session management table. Additionally, the session management unit 54 sets operating states to "communicating" in relation to the transmission terminals 10aa and 10ab, in the terminal management table.

S10, S11: The session management unit 54 of the transmission management system 50 informs the transmission terminals 10aa and 10ab of the respective global IP addresses and port numbers of each other, for the above-described NUT traversal.

S12: Accordingly, the transmission terminals 10aa and 10ab are capable of starting communication with each other on the α-communication PF.

<<Switching of Communication PF>>

Figure 11:
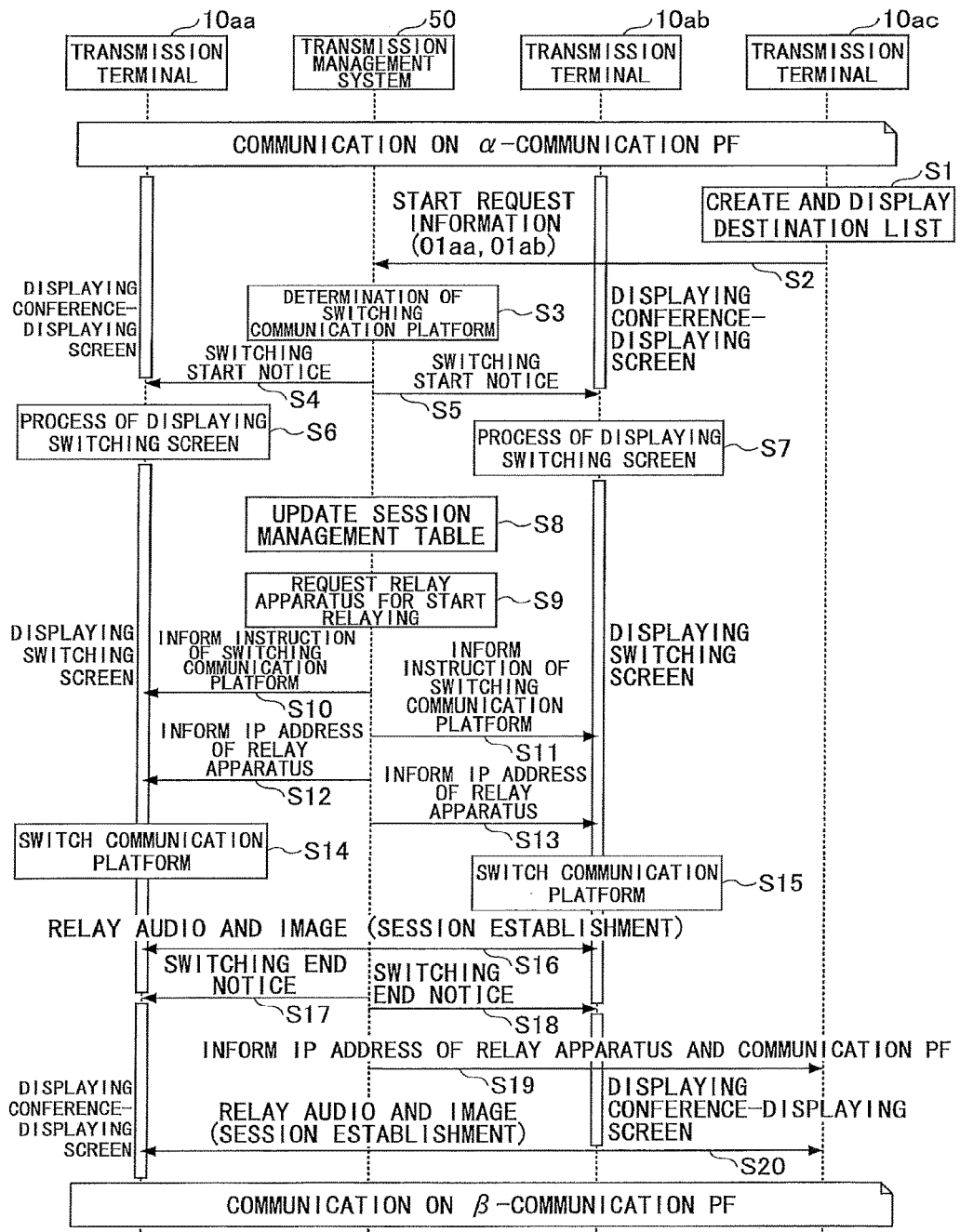
FIG. 11 is one example of a sequence chart illustrating a procedure of switching a communication PF.

Then, a procedure of switching the communication PF will be described by using FIG. 11. FIG. 11 is one example of a sequence chart illustrating a procedure of switching the communication PF. Before switching the communication PF, the transmission terminals 10aa and 10ab communicate with each other on the α-communication PF, and display a conference-displaying screen 602.

S1: A transmission terminal 10ac also logs in the transmission management system 50 in a similar manner to the transmission terminals 10aa and 10ab, and displays a destination list. Accordingly, the transmission terminal 10ac transmits start request information with the transmission terminal 10aa being a destination terminal, to the transmission management system 50. Note that the transmission terminal 10aa may inform of a session ID to invite the transmission terminal 10ac to a teleconference.

S2: A transmitting and receiving unit 11 of the transmission terminal 10ac transmits start request information to the transmission management system 50. The start request information includes a request source communication ID and a destination communication ID. Accordingly, the transmitting and receiving unit 51 of the transmission management system 50 learns the IP address of the request source terminal 10ac.

S3: The PF switch determining unit 52 of the transmission management system 50 determines whether the communication PF is to be switched, based on the communication situation detected by the communication situation detecting unit 55. The start request information from the transmission terminal 10ac indicates that the transmission terminal 10ac and the transmission terminal 10aa are going to participate in the same teleconference. Additionally, the transmission terminal 10ab, which is already participating in the teleconference with the transmission terminal 10aa, is included in the counting of the total number, according to the conference ID in the session management table. Thus, the number of sites is increased to three. According to the PF determination table, in a case of three or more sites, switching of the communication PF to the β-communication PF is determined. Note that in FIG. 16, before the transmission terminal 10ac communicates on the α-communication PF, the communication PF is switched. However, after the transmission terminal 10ac participated in the teleconference on the α-communication PF, the communication PF may be switched.

S4, S5: The PF switch determining unit 52 transmits a switching start notice to the transmission terminals 10aa and 10ab through the transmitting and receiving unit 51.

S6, S7: The transmission terminals 10aa and 10ab end displaying the conference-displaying screen 602, and perform a process of displaying the switching screen 601. Such a process will be described below.

S8: Then, the session management unit 54 updates the session management table. The updated session management table is illustrated in Table 6.

That is, the communication PF is switched from the α-communication PF to the β-communication PF, and the relay apparatus 30, which is needed for the β-communication PF, is determined and registered for a relay apparatus ID. Additionally, the session management unit 54 registers a session ID, a communication PF, a relay apparatus ID, a request source communication ID, a destination communication ID, and a conference ID of the session between the transmission terminals 10aa and 10ac. Note that the session of the transmission terminals 10aa and 10ab does not necessarily transition as illustrated in Table 8, and a new session ID and the like may be created. Alternatively, a session management table created in a format suitable for each communication PF may be prepared, so that the session ID and the like may be registered in a session management table in the format corresponding to the communication PF after switching.

S9: The session management unit 54 requests start of relay to the relay apparatus 30, together with the communication IDs of transmission terminals 10aa, 10ab, and 10ac. Accordingly, the transmission terminals 10aa, 10ab, and 10ac are participating in a single teleconference, and the relay apparatus 30 is capable of relaying, for example, content data transmitted from the transmission terminal 10aa to the transmission terminals 10ab and 10ac.

S10, S11: The PF switch determining unit 52 of the transmission management system 50 informs the transmission terminals 10aa and 10ab of an instruction of switching the communication platform. Accordingly, the communication PF after switching is informed to the transmission terminal 10aa and the transmission terminal 10ab.

S12, S13: The PF switch determining unit 52 of the transmission management system 50 informs the transmission terminals 10aa and 10ab of the IP address of the relay apparatus 30. Accordingly, the transmission terminal 10aa and the transmission terminal 10ab are capable of transmitting content data to the relay apparatus 30.

S14, S15: The transmission terminal 10aa changes the communication PF, and the transmission terminal 10ab changes the communication PF. That is, the transmission terminals 10aa and 10ab each switch from communication using the transmitting and receiving unit 11 with the α-functional unit 11a to the communication using the transmitting and receiving unit 11 with the β-functional unit 11b.

S16: In the above process, a session is established such that the transmission terminal 10aa and the transmission terminal 10ab are capable of transmitting and receiving content data through the relay apparatus 30. The relay apparatus 30 (or the transmission terminal 10aa and the transmission terminal 10ab) informs the transmission management system 50 of the session establishment, so that the transmission management system 50 determines that the screen may be switched to the conference-displaying screen 602.

TABLE 8

(SESSION MANAGEMENT TABLE)

| SESSION ID | COMMUNICATION PF | RELAY APPARATUS ID | REQUEST SOURCE COMMUNICATION ID | DESTINATION COMMUNICATION ID | CONFERENCE ID |
|---|---|---|---|---|---|
| se1 | β | 111a | 01aa | 01ab | k001 |
| se2 | β | 111b | 01ac | 01aa | k001 |
| ... | ... | ... | ... | ... | ... |

S17, S18: The PF switch determining unit 52 of the transmission management system 50 informs the transmission terminals 10aa and 10ab of a switching end notice. Accordingly, the transmission terminals 10aa and 10ab switch the switching screen 601 to the conference-displaying screen 602.

S19: Then, the PF switch determining unit 52 of the transmission management system 50 informs the transmission terminal 10ac of the IP address of the relay apparatus 30 and the communication PF. Accordingly, the transmission terminal 10ac is capable of transmitting the content data to the relay apparatus 30 through the transmitting and receiving unit 11 with the β-functional unit 11b.

S20: In the above process, a session has been established to allow the transmission terminal 10aa and the transmission terminal 10ac to transmit and receive the content data through the relay apparatus 30.

Note that in FIG. 11, the transmission management system 50 informs the transmission terminals 10aa and 10ab of the switching end notice, but the transmission terminals 10aa and 10ab may detect an end of switching the communication PF. For example, the transmission terminals 10aa and 10ab are capable of communicating with each other through the relay apparatus 30, and are therefore capable of detecting the end of switching the communication PF.

Additionally, a timing for switching from the conference-displaying screen 602 to the switching screen 601 and a timing for switching from the switching screen 601 to the conference-displaying screen 602 are only examples. In FIG. 11, sequentially from the transmission terminal 10, for which the communication PF has been switched, the transmission terminals 10 respectively stop displaying the switching images and display conference-participating images again. That is, timings when the transmission terminals 10 display the conference-participating images again are different from each other. In such a method, the periods while the respective transmission terminals 10 are displaying the switching images are shortened.

In contrast, when the transmission management system 50 has finished establishing sessions with all the transmission terminals 10, the transmission management system 50 may transmit the switching end notice to the respective transmission terminals 10. This configuration may lengthen the periods while the respective transmission terminals 10 are displaying the switching screen 601. However, since all the transmission terminals 10 switch the switching screens 601 to the conference-displaying screens 602 almost at the same time, users of the respective sites are able to start a teleconference all together.

Additionally, even when the switching of the communication PF ends, the transmission terminals 10 may not necessarily switch the switching screen 601 to the conference-displaying screen 602. For example, while a switching screen 601, which is useful for a user, is being displayed, the user is able to operate the transmission terminal 10 to continue displaying such a switching screen 601.

<<Process of Displaying Switching Screen>>

Figure 12:
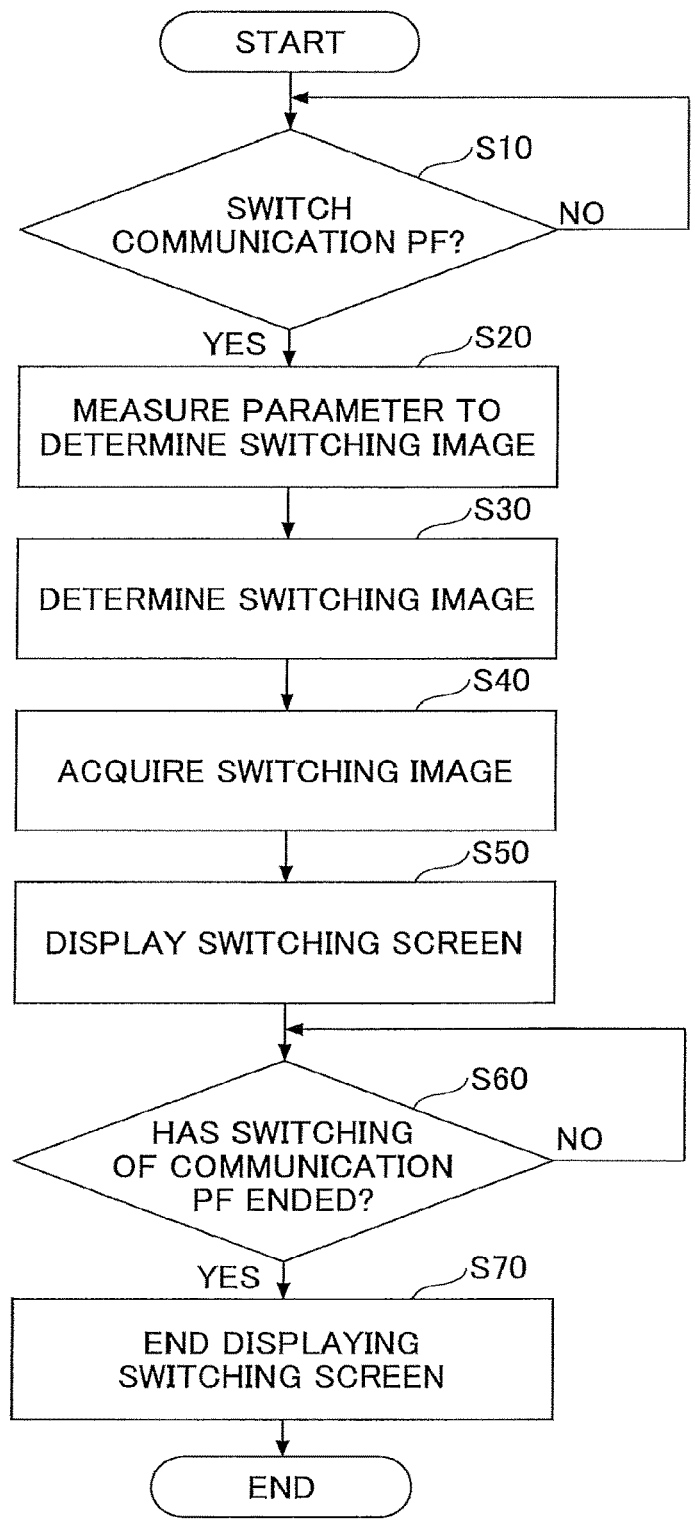
FIG. 12 is one example of a flowchart illustrating a procedure of a process performed by a transmission terminal to end displaying of a conference-displaying screen and to display a switching screen.

Subsequently, in steps S6 and S7 of FIG. 11, a process performed by the transmission terminal 10 to end displaying the conference-displaying screen 602 and to display the switching screen 601 will be described. FIG. 12 is one example of a flowchart illustrating a procedure of the process performed by the transmission terminal 10 to end displaying the conference-displaying screen 602 and to display the switching screen 601. The process of FIG. 12 is performed, while the conference-displaying screen 602 is being displayed.

First, the switching image determining unit 21 determines whether the communication PF is to be switched (S10). That is, the switching image determining unit 21 determines whether a switching start notice has been transmitted from the transmission management system 50. Unless the switching start notice is transmitted, the transmission terminals 10 perform nothing.

When the switching start notice is transmitted (Yes in S10), the switching image determination parameter measuring unit 18 of the transmission terminal 10 measures a parameter to select a switching image (S20). The switching image determination parameter measuring unit 18 measures a network bandwidth, by transmitting data for parameter measurements to the transmission management system 50. Additionally, in a case where the communication PF is WebRTC (P2P), the number of conference-participating sites is the number of sites (the number of transmission terminals 10) to which audio and image are transmitted from the transmission terminal 10, and the transmission terminal 10 knows the number. Alternatively, the transmission terminal 10 may inquire the transmission management system 50 for the number of transmission terminals 10 each having the identical conference ID to the conference ID of the inquiring transmission terminal 10.

Note that when the switching start notice is transmitted, the transmission terminal 10 may superimpose a message "from now the communication platform is to be switched" on the conference-displaying screen 602, and may display such a message on the display 120. Accordingly, a notice period for switching the conference-displaying screen 602 to the switching screen 601 can be provided.

The switching image determining unit 21 of the transmission terminal 10 refers to a switching image setting management table based on, for example, a network bandwidth and the number of conference-participating sites, and determines a switching image number (S30).

Then, the switching image determining unit 21 of the transmission terminal 10 reads the file of the switching image number that is determined in step S30, from the switching image management table (S40).

Figure 13:
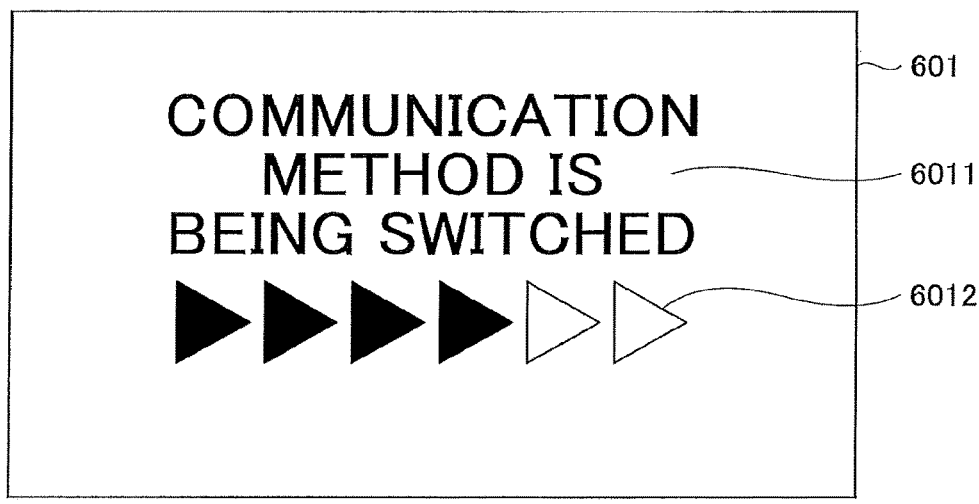
FIG. 13 is a diagram illustrating one example of a switching image.
Figure 14:
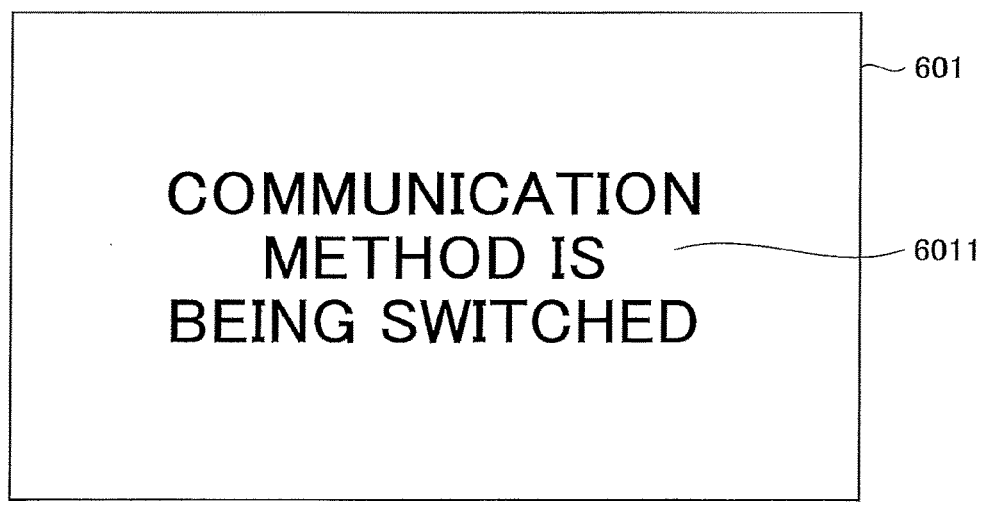
FIG. 14 is a diagram illustrating one example of the switching image.
Figure 15:
FIG. 15 is a diagram illustrating one example of the switching image.

The display controlling unit 12 of the transmission terminal 10 displays on the display 120 the switching screen 601 as illustrated in FIG. 13, FIG. 14, and FIG. 15 (S50). Accordingly, the switching screen 601, which is suitable for the network bandwidth and the number of conference-participating sites, is displayed.

After the switching screen 601 is displayed, the switching image determining unit 21 of the transmission terminal 10 determines whether the switching of the communication PF has completed (S60). That is, the switching image determining unit 21 determines whether the switching end notice is acquired from the transmission management system 50, or whether a session with another transmission terminal 10, which is a communication destination, through the relay apparatus 30 is established.

When the switching of the communication PF ends (Yes in S60), the display controlling unit 12 ends displaying the switching screen 601 and displays the conference-displaying screen 602 again (S70).

FIG. 13 is a diagram illustrating one example of a switching image. The switching image may be called a switching screen 601. The switching image (may be referred to as a switching screen 601) of FIG. 13 is one scene in a moving image. The switching image includes a message 6011 "the communication system is being switched" and icons 6012 indicating that the switching is proceeding. As a moving image, colored portions in the icons 6012 are changing with time. The switching image of such a moving image may be created to be sufficiently longer than a period needed for switching the communication PF, or the display controlling unit 12 may play the same switching image repeatedly while the communication PF is being switched. To enable the switching image using a still image, six still images (to be identical in number of triangular icons) different in colored portions of the icons 6012 may be prepared, and displayed on the display 120 so that the display controlling unit 12 changes the icons 6012 with time.

Additionally, in addition to the message 6011 indicating "the communication system is being switched", the communication PFs before and after may also be displayed. This configuration informs users of the type of communication PF to be switched to. Hence, depending on the user, it is possible to predict how the audio and image qualities change.

For a switching image of a still image, a still image with more information is selected as the period needed for the switching becomes longer. FIG. 14 is one example of a switching image that is displayed in a case where the period needed for the switching is short. FIG. 15 is one example of a switching image that is displayed in a case where the period needed for the switching is long. In the case where the period needed for the switching is long, an increased amount of information would produce an effect of relieving the user's feeling that the switching period is long. Also, much information can be given to users, such as a URL 6019 of FIG. 15.

As described above, while the transmission system 1 in the present example is switching the communication PF on which the teleconference is being held, the switching screen 601 is displayed on the display 120. This allows users to understand the state of the transmission system 1. For example, in a case where the switching period is long, a long moving image can be displayed, or news or a promotion video can be displayed. Additionally, advertisements may be displayed for non-paying users, so that a service provider may be enabled to collect the fees for the transmission system 1.

<Variation>

Figure 16:
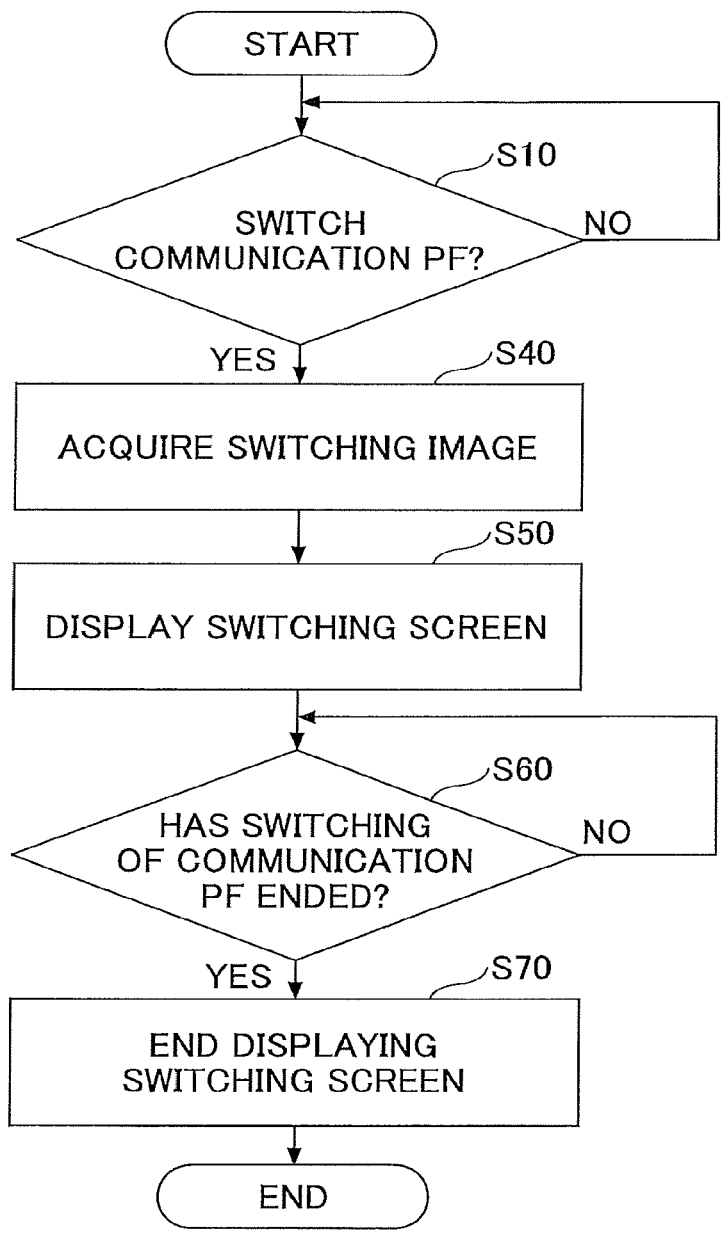
FIG. 16 is one example of a flowchart illustrating a procedure of a process performed by the transmission terminal to end displaying of the conference-displaying screen and to display the switching screen.

Note that in the present example, since a plurality of still images or moving images to be displayed on the switching screen 601 are prepared, parameters for selecting the switching image are measured. However, when only one switching image is prepared regardless of a still image or a moving image, no parameter measurement is needed. FIG. 16 illustrates a flowchart corresponding to FIG. 12 in such a case. FIG. 16 is one example of a flowchart illustrating a procedure of a process performed by the transmission terminal 10 to end displaying the conference-displaying screen 602 and to display the switching screen 601. FIG. 16 does not include processes of step S20 in which the switching image determination parameter measuring unit 18 measures a parameter and step S30 in which the switching image determining unit 21 determines a switching image. However, as there is only one switching image, there are no complications in switching the switching image.

Alternatively, even when a plurality of switching images are prepared and the switching image determining unit 21 determines a switching image randomly, there are no complications in switching the switching image.

Example 2

In the present example, the transmission terminal 10 for determining a switching image according to a period that has been taken for switching the communication PF will be described.

Figure 17:
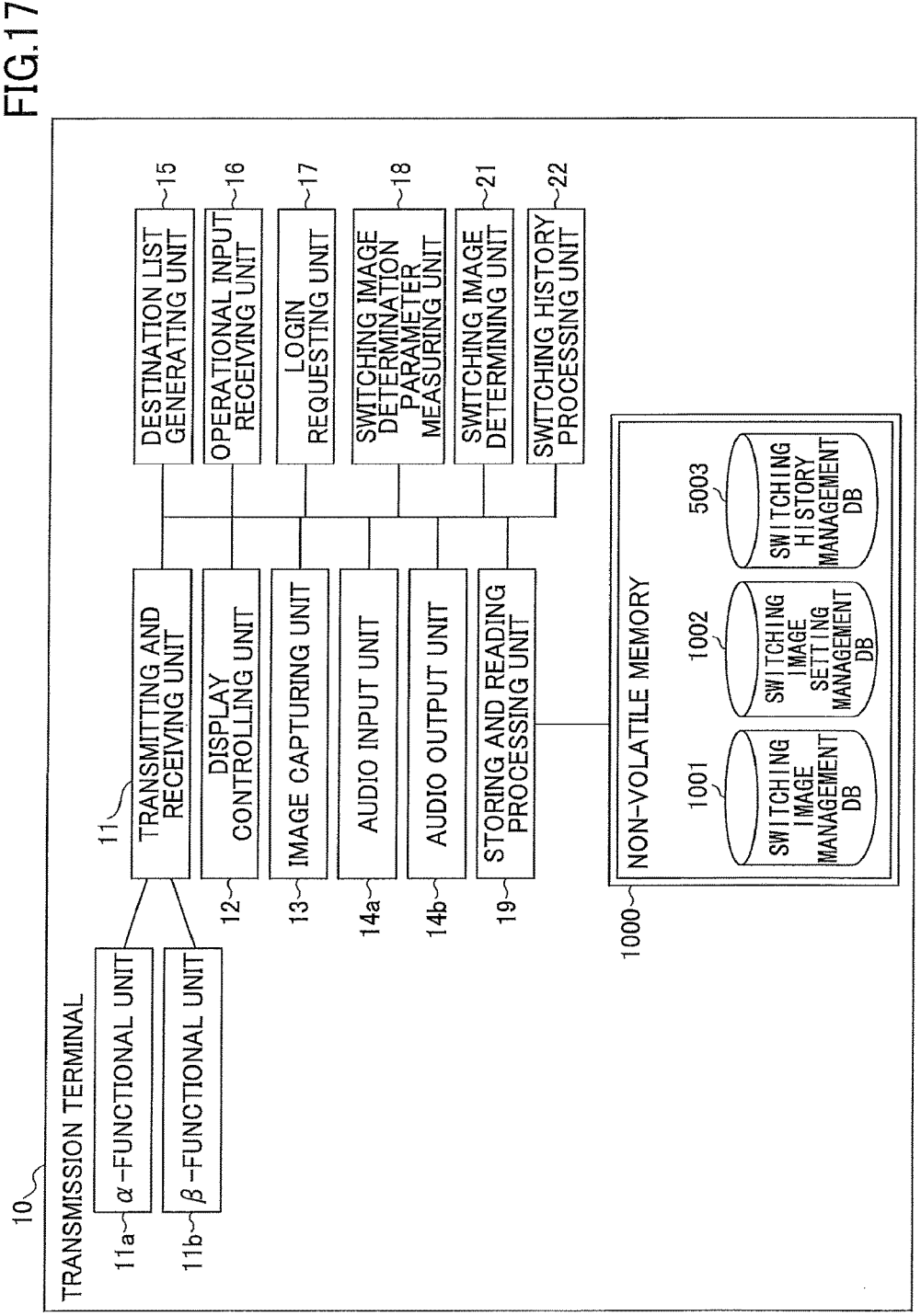
FIG. 17 is one example of a functional block diagram of the transmission terminal.

FIG. 17 is one example of a functional block diagram of a transmission terminal 10 in the present example. Note that the illustration of the transmission management system 50 is omitted, because it is the same as the transmission management system 50 of FIG. 9 in Example 1. In the present example, as component elements having the identical codes in FIG. 9 perform similar functions, only main component elements in the present example will be described, in some cases.

First, a switching image setting management DB 1002 in the present example will be described.

TABLE 9

(SWITCHING IMAGE SETTING MANAGEMENT TABLE)

| MANAGEMENT NUMBER | SWITCHING PERIOD | SWITCHING IMAGE NUMBER |
|---|---|---|
| t_001 | 0 s OR MORE LESS THAN 3 s | i_001 |
| t_002 | 3 s OR MORE LESS THAN 10 s | i_003 |
| t_003 | 10 s OR MORE LESS THAN 30 s | i_005 |
| ... | ... | ... |

In a non-volatile memory 1000, a switching image setting management DB 1002 (one example of a switching period storing unit), which is configured with a switching image setting management table as illustrated in Table 9, is implemented. The function of the switching image setting management table of Table 9 is similar to the switching image setting management table of Table 2. In the switching image setting management table of Table 9, a switching period and a switching image number are registered in relation to a management number.

In such a switching image setting management table, the period (switching period) that has been taken for switching the communication PF is managed in relation to the switching image number. Therefore, the switching image determining unit 21 in the present example is capable of determining a switching image based on the switching period (a switching period that has been previously measured) of the communication PF.

TABLE 10

(SWITCHING HISTORY MANAGEMENT TABLE)

| SWITCHING DATE AND TIME | SWITCHING PERIOD |
|---|---|
| 2014/10/12 12:12:12 | 2 s |
| 2014/10/13 13:13:13 | 18 s |
| 2014/10/14 14:14:14 | 5 s |
| ... | ... |

In the non-volatile memory 1000, a switching history management DB 1003, which is configured with a switching history management table as illustrated in Table 10, is implemented. In the switching history management table, a switching period is managed in relation to switching date and time when the communication PF was switched. Note that, the switching date and time may not be included, but since the switching date and time is recorded, the switching period, for example, in the last week, on the same weekday in the past, or in the same time range can be referred to.

Next, functions of the transmission terminal 10 will be described. As illustrated in FIG. 17, the transmission terminal 10 in the present example includes a switching history processing unit 22. The switching history processing unit 22 is enabled by instructions from the CPU 101 illustrated in FIG. 7, and stores a switching period that has been taken for switching the communication PF in relation to the switching date and time, in a switching history management DB 1003. The switching period is, for example, a period from the switching start notice of step S4 to the switching end notice in step S18 in the sequence chart of FIG. 11, or from the switching start notice in step S4 to the session establishment in step S20 in the sequence chart of FIG. 11. In addition, for example, the switching period may be a period from the time of starting displaying the switching screen 601 to the time of ending displaying, or may be a period from the time of ending displaying the conference-displaying screen 602 to the time of starting displaying the conference-displaying screen 602 again. The switching period measured by the transmission management system 50 may be acquired by the transmission terminal 10 and may be registered in the switching history management DB 1003.

The switching image determining unit 21 in the present example (one example of a switching period estimating unit) estimates a switching period of the communication PF according to the switching period stored in the switching history management table.

Figure 18:
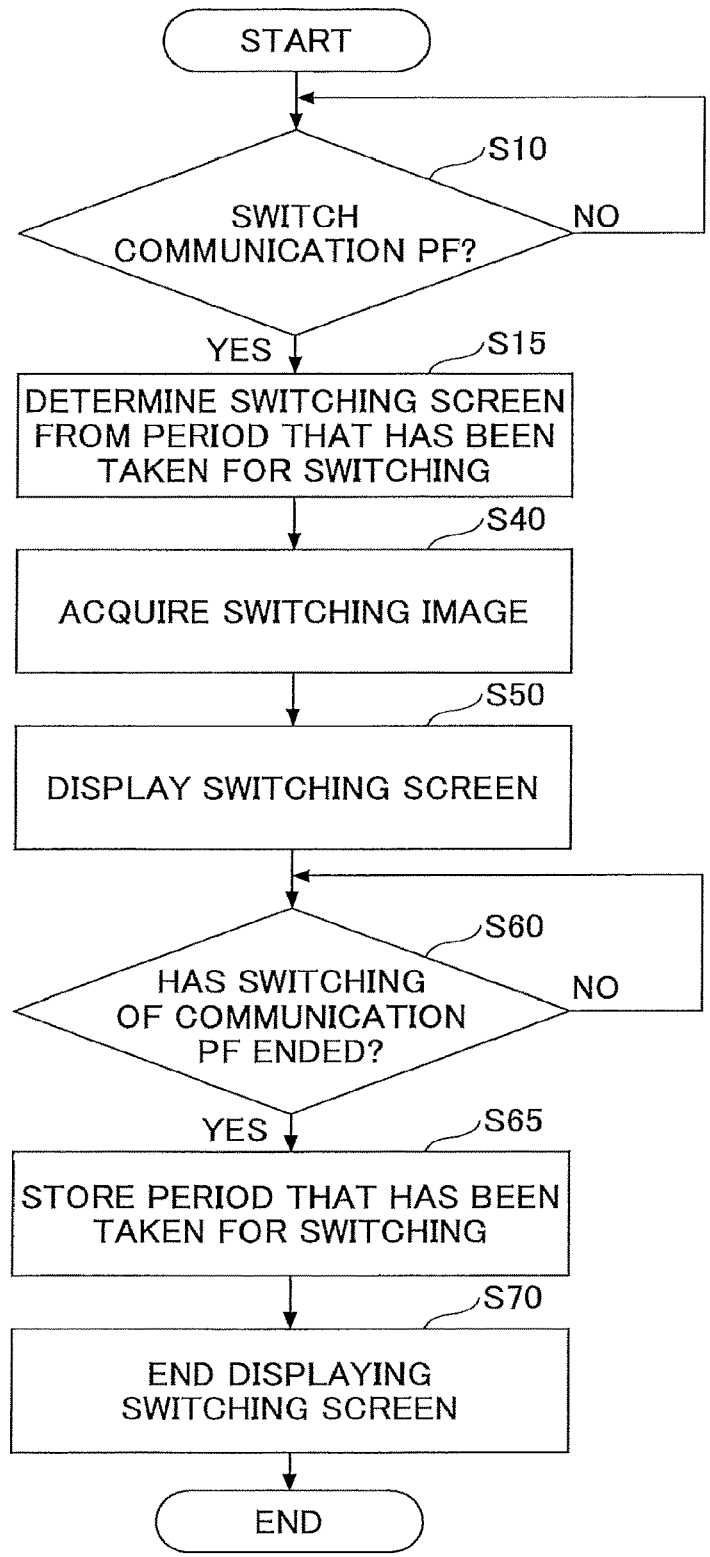
FIG. 18 is one example of a flowchart illustrating a procedure of a process performed by the transmission terminal to end displaying the conference-displaying screen and to display the switching screen (Example 2)

Subsequently, a process performed by the transmission terminal 10 to end displaying the conference-displaying screen 602 in steps S6 and S7 of FIG. 11 and to display the switching screen again will be described. FIG. 18 is one example of a flowchart illustrating a procedure of a process performed by the transmission terminal 10 to end displaying the conference-displaying screen 602 and to display the switching screen 601.

First, the switching image determining unit 21 determines whether the communication PF is to be switched (S10). That is, the switching image determining unit 21 determines that a switching start notice has been transmitted from the transmission management system 50. Unless the switching start notice is transmitted, the transmission terminals 10 perform nothing.

In a case where the switching start notice is transmitted (Yes in S10), the switching image determining unit 21 refers to the switching history management table and the switching image setting management table, and determines a switching image (S15). Note that when the switching start notice is transmitted, the measurement of the switching period starts. The trigger for starting the measurement of the switching period is not limited to this.

Determination of a switching image will be described. In the switching history management table, for example, the following switching periods are referred to.

The latest date and time
Average of all histories
Average of histories of a predetermined number in the past
Average of histories for one week in the past
Average of histories in the past of the same weekday with as current and the same time range The switching image determining unit 21 refers to the switching history management table, and estimates the switching period, as described above. Then, the switching image determining unit 21 reads from the switching history management table, a switching image number in relation to the switching period that has been estimated by referring to the switching history management table. For example, in a case where six seconds is a switching period that has been estimated with reference to the switching history management table, i_003 is read as the switching image number.

Processes from the following steps S40 to S60 are the same as the processes in FIG. 12.

Then, when the switching of the communication PF ends, the switching history processing unit 22 ends measuring the switching period, and stores the measured switching period together with the date and time in the switching history management table (S65). The process of step S70 is the same as the process of step S70 in FIG. 12.

In accordance with the above-mentioned processes, the transmission terminal 10 becomes capable of using an optimal switching image in consideration of an actual period that has been taken for switching the communication PF.

<Variation>

For example, Example 1 and the switching image setting management table in the present example may be used in combination, as follows.

TABLE 11

(SWITCHING IMAGE SETTING MANAGEMENT TABLE)

| MANAGEMENT NUMBER | NETWORK BANDWIDTH | THE NUMBER OF CONFERENCE-PARTICIPATING SITES | SWITCHING PERIOD | ... | SWITCHING IMAGE NUMBER |
|---|---|---|---|---|---|
| c_001 | 1000 kbps OR MORE | 2 | 0 s OR MORE AND LESS THAN 3 s<br>3 s OR MORE AND LESS THAN 10 s<br>10 s OR MORE AND LESS THAN 30 s | ... | i_001<br>i_002<br>i_003 |
| c_002 | LESS THAN 1000 kbps | 2 | 0 s OR MORE AND LESS THAN 3 s<br>3 s OR MORE AND LESS THAN 10 s<br>10 s OR MORE AND LESS THAN 30 s | ... | i_004<br>i_005<br>i_006 |
| c_003 | 1000 kbps OR MORE | 3 OR MORE | 0 s OR MORE AND LESS THAN 3 s<br>3 s OR MORE AND LESS THAN 10 s<br>10 s OR MORE AND LESS THAN 30 s | ... | i_007<br>i_008<br>i_009 |
| c_004 | LESS THAN 1000 kbps | 3 OR MORE | 0 s OR MORE AND LESS THAN 3 s<br>3 s OR MORE AND LESS THAN 10 s<br>10 s OR MORE AND LESS THAN 30 s | ... | i_010<br>i_011<br>i_012 |
| ... | ... | ... | ... | ... | ... |

Table 11 illustrates another example of the switching image setting management table. Functions of the switching image setting management table of Table 11 are similar to the functions of the switching image setting management table of Table 2. In the switching image setting management table of Table 11, a network bandwidth, the number of conference-participating sites, a switching period, and a switching image number are registered in relation to a management number.

Use of such a switching image setting management table enables the switching image determining unit 21 to read the switching image number that is suitable for the switching period that has been estimated from the switching history management table, from among the switching periods in relation to the network bandwidth and the number of conference-participating sites at the time of switching the communication PF. From among the switching periods in relation to the network bandwidth and the number of conference-participating sites that are at least the same as the present ones, the switching image number in relation to the estimated switching period is acquired. Hence, it is easy to select a more suitable switching image.

Additionally, as illustrated in Table 12, the network bandwidth and the number of conference-participating sites may be registered in the switching history management table.

TABLE 12

(SWITCHING HISTORY MANAGEMENT TABLE)

| SWITCHING DATE AND TIME | NETWORK BANDWIDTH | THE NUMBER OF CONFERENCE-PARTICIPATING SITES | SWITCHING PERIOD |
| --- | --- | --- | --- |
| 2014/10/12 12:12:12 | 1000 kbps OR MORE | 2 | 2 s |
| 2014/10/13 13:13:13 | LESS THAN 1000 kbps | 2 | 18 s |
| 2014/10/14 14:14:14 | 1000 kbps OR MORE | 3 OR MORE | 5 s |
| . . . | LESS THAN 1000 kbps | 3 OR MORE | . . . |
|  | . . . | . . . |  |

Table 12 illustrates another example of the switching history management table. In the switching history management table of Table 12, a network bandwidth, the number of conference-participating sites, and a switching period are registered in relation to a switching date and time. Therefore, use of such a switching history management table enables the switching image determining unit 21 to read the network bandwidth at the time of switching the communication PF and the switching period in relation to the number of conference-participating sites. Then, the switching image determining unit 21 reads the switching image number in relation to the switching period from the switching image setting management table as illustrated in Table 9.

Like the switching history management table of Table 12, by acquiring a switching period in a communication situation same as the communication situation at the time of switching the communication PF (the network bandwidth and the number of conference-participating sites), the switching image determining unit 21 is capable of improving the accuracy in predicting a switching period. Therefore, it becomes easy to select a suitable switching image.

Example 3

In the present example, a transmission terminal 10, which uses an image of a conference as a switching image, will be described.

Figure 19:
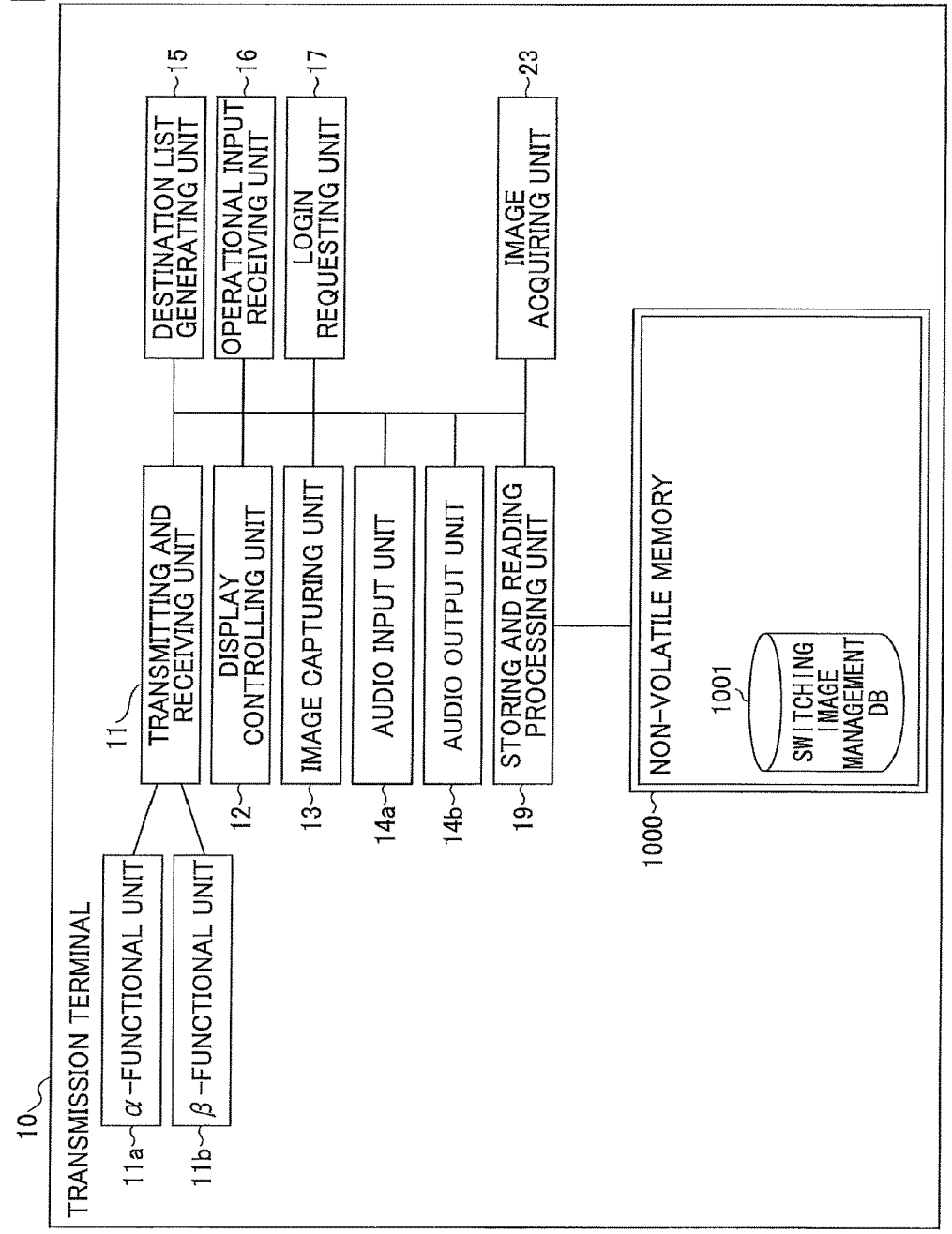
FIG. 19 is one example of a functional block diagram of a transmission terminal.

FIG. 19 is one example of a functional block diagram of a transmission terminal 10 in the present example. Note that the transmission management system 50 is the same as the transmission management system 50 in FIG. 9 in the first embodiment, and its illustration is omitted. In the present example, component elements having the identical codes in FIG. 9 perform similar functions, and hence in some cases, only main component elements in the present example will be described.

As illustrated in FIG. 19, the switching image setting management DB 1002 is not implemented in the non-volatile memory 1000 in the present example. Additionally, an image of the conference-displaying screen 602 displayed on the display 120 during the conference is stored in the switching image management DB 1001 of the present example. For example, an image of the conference-displaying screen 602, which has been displayed immediately before the communication PF is switched, is stored. Accordingly, while the communication PF is being switched, the transmission terminals 10 are respectively capable of displaying the images immediately before switching of the communication PF starts.

Next, the functions of the transmission terminal 10 will be described. As illustrated in FIG. 19, the transmission terminal 10 in the present example includes an image acquiring unit 23. The image acquiring unit 23 is enabled by instructions from the CPU 101 illustrated in FIG. 7, and takes in (captures) an image displayed on the display 120.

Figure 20:
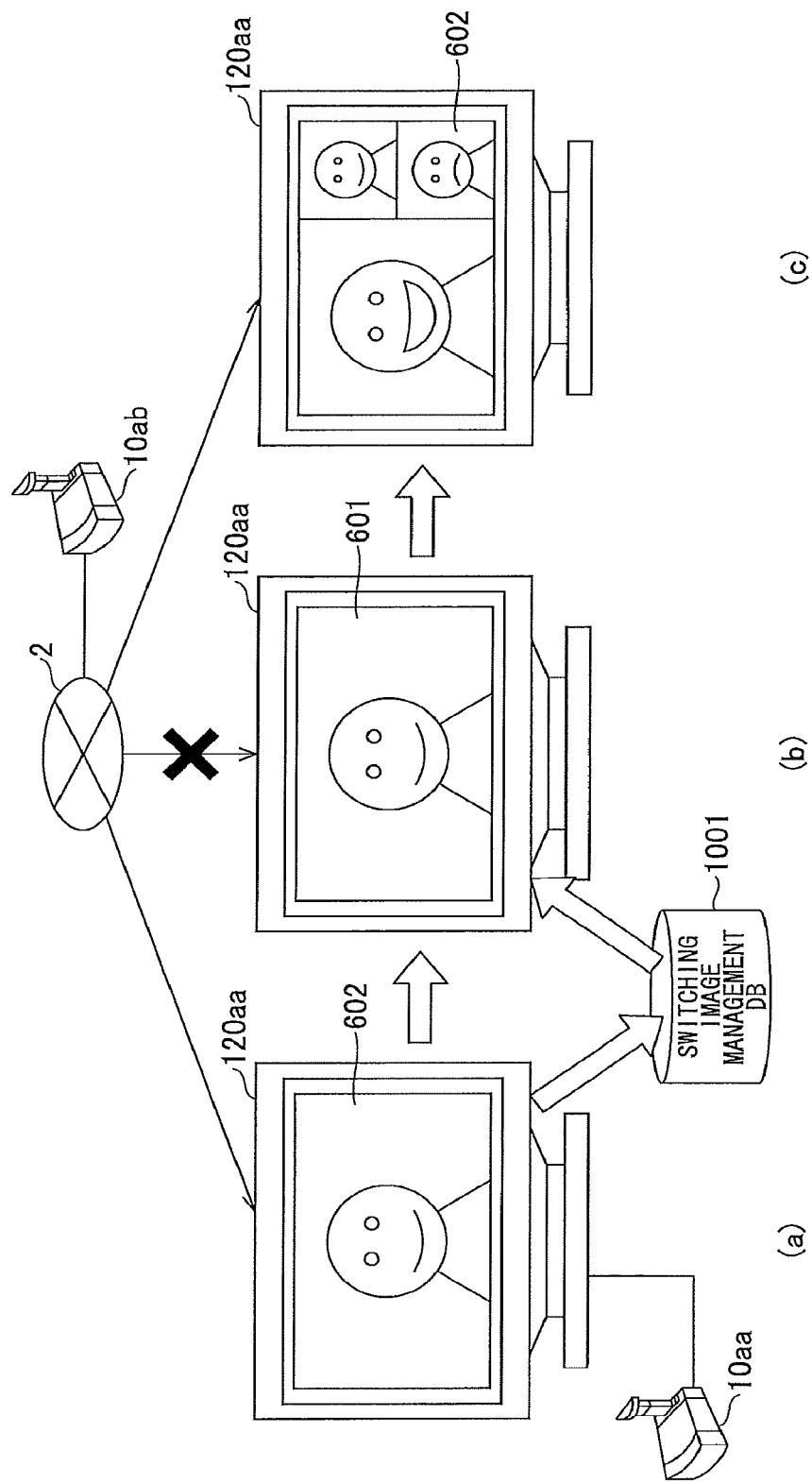
FIG. 20 is one example of a diagram schematically illustrating capturing of the conference-displaying screen displayed in a display and displaying of the switching screen.
Figure 21:
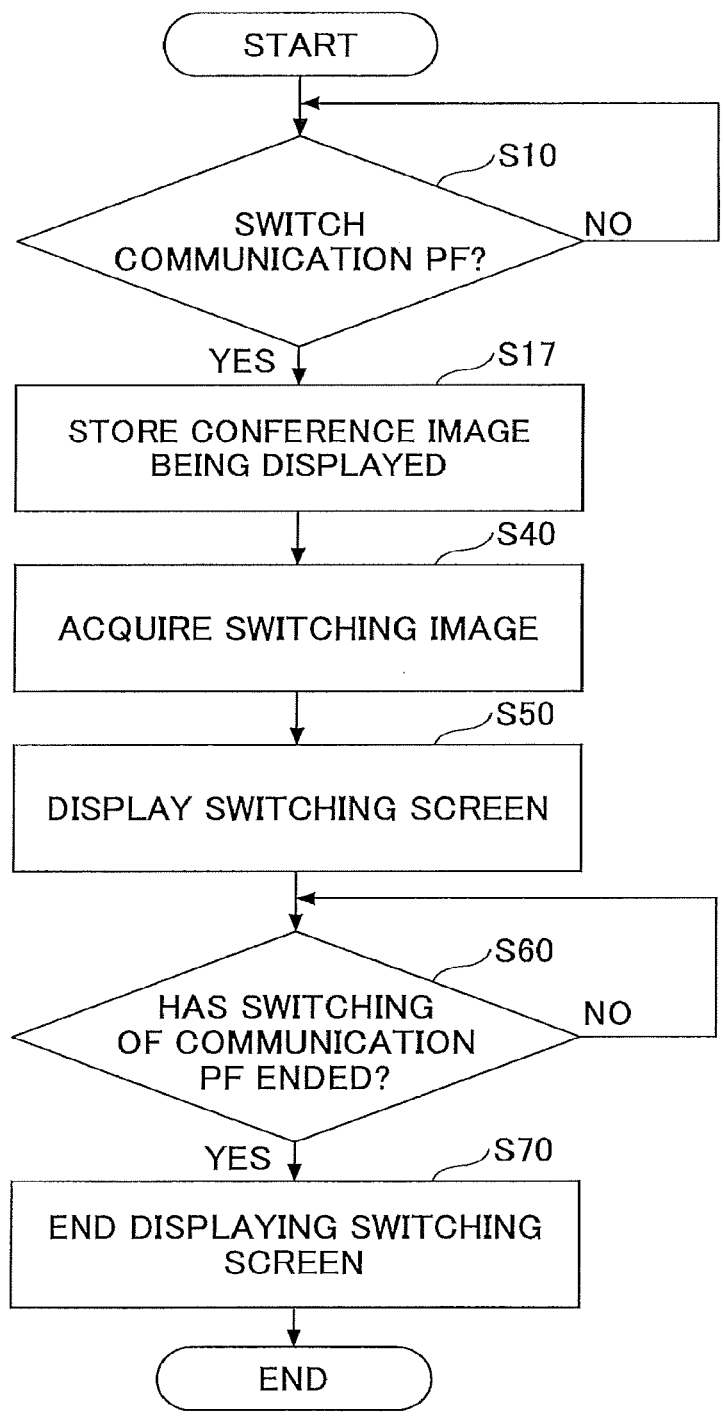
FIG. 21 is one example of a flowchart illustrating a procedure of a process performed by the transmission terminal to end displaying the conference-displaying screen and to display the switching screen (Example 3)

Capturing of an image and displaying of the switching screen 601 will be described by using FIG. 20. FIG. 20 is one example of a diagram schematically illustrating capturing of the conference-displaying screen 602 displayed in the display 120 and displaying of the switching screen 601. (a) of FIG. 20 illustrates the conference-displaying screen 602, which is displayed on a display 120aa before the communication PF is switched. (b) of FIG. 20 illustrates the switching screen 601, which is displayed on the display 120aa after the switching of the communication PF starts. (c) of FIG. 20 illustrates the conference-displaying screen 602, which is displayed on the display 120aa after the communication PF is switched.

In (a) of FIG. 20, the transmission terminal 10aa displays on the display 120aa the image that has been transmitted from the transmission terminal 10ab. When the switching of the communication PF starts, the image acquiring unit 23 of the transmission terminal 10aa takes in the conference-displaying screen 602, which is being displayed on the display 120aa, and stores the image of the conference-displaying screen 602 in the switching image management DB 1001.

As illustrated in (b) of FIG. 20, while the communication PF is being switched, the transmission terminal 10aa reads an image of the conference-displaying screen 602, which has been taken in from the switching image management DB 1001, and displays the image on the display 120aa. Additionally, as illustrated in (b) of FIG. 20, while the communication PF is being switched, the transmission terminal 10aa reads the image that has been taken in from the switching image management DB 1001, and displays the image on the display 120aa. Additionally, as illustrated in (c) of FIG. 20, when the switching of the communication PF ends, the transmission terminal 10aa displays on the display 120aa the conference-displaying screen 602, which includes images that have been transmitted from the transmission terminal 10ab and another transmission terminal 10ac.

Therefore, the transmission terminal 10 takes in an image immediately before the communication PF is switched, and is capable of displaying the switching screen 601, which makes it difficult for users to recognize that the communication PF is being switched.

Subsequently, processes of ending displaying the conference-displaying screen 602 and then displaying the switching screen 601 in steps S6 and S7 of FIG. 11 will be described. FIG. 16 is an example of a flowchart illustrating a procedure of the process performed by the transmission terminal 10 to end displaying the conference-displaying screen 602 and to display the switching screen 601.

First, the switching image determining unit 21 determines whether the communication PF is to be switched (S10). That is, the switching image determining unit 21 determines whether the switching start notice has been transmitted from the transmission management system 50. Unless the switching start notice is transmitted, the transmission terminals 10 perform nothing.

In a case where the switching start notice is transmitted (Yes in S10), the image acquiring unit 23 takes in the conference-displaying screen 602, which is being displayed on the display 120, and stores the image of the conference-displaying screen 602 as a switching image, in the switching image management DB 1001 (S17).

The display controlling unit 12 reads the image that has been taken in step S20 from the switching image management DB 1001 (S40). Processes from the following steps S50 to S70 are the same as the processes of steps S50 to S70 in FIG. 12.

Therefore, the transmission terminals 10 in the present example are capable of displaying the switching screen 601, which is difficult for users to recognize the switching of the communication PF. Additionally, there is no need to prepare a switching image beforehand.

Note that the image acquiring unit 23 may take in a plurality of still images. For example, the image acquiring unit 23 detects that, for example, displayed contents on a screen have greatly changed (e.g., a case where the number of participating sites changes, a case where the displayed image is changed form a person to a document, and the like), and takes in the image in each case. Note that the image acquiring unit 23 may take in a still image on a regular basis.

Figure 22:
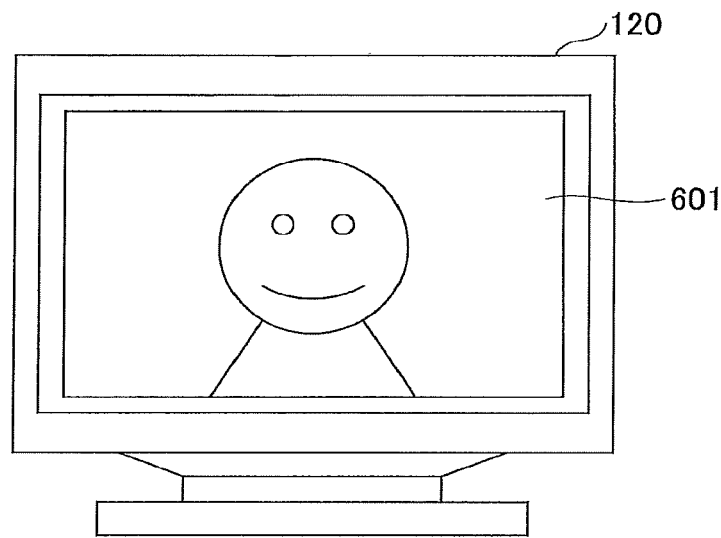
FIG. 22 is a view illustrating one example of a switching screen.
Figure 23:
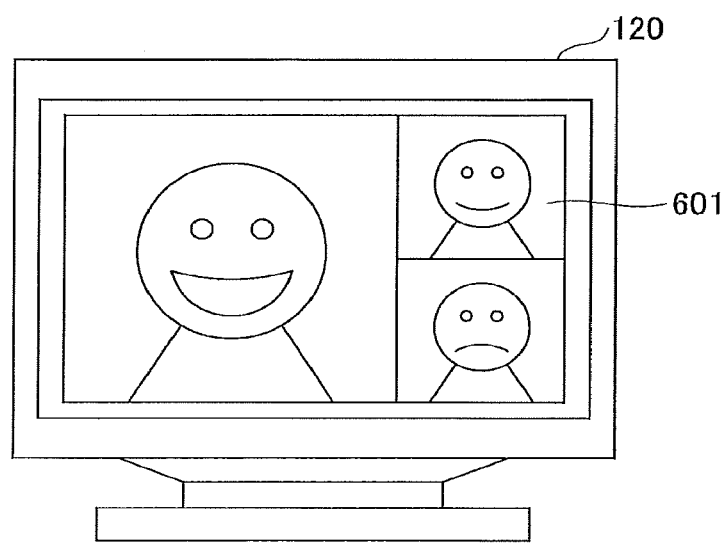
FIG. 23 is a view illustrating one example of the switching screen.
Figure 24:
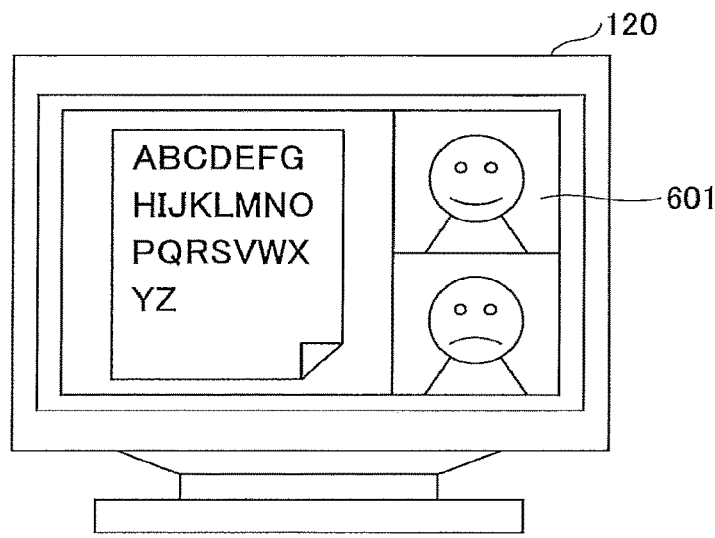
FIG. 24 is a view illustrating one example of the switching screen.

FIG. 22, FIG. 23, and FIG. 24 are views illustrating examples of the switching screen 601 displayed on the display 120. FIG. 22, FIG. 23, and FIG. 24 each serve as the switching screen 601. While the communication PF is being switched, the display controlling unit 12 displays still images that are stored in the switching image management DB 1001, as the switching screens 601, for example, for several seconds, respectively. Users are able to think back on subjects of the conference, and are able to utilize the switching period of the communication PF effectively. Note that the switching screens 601 of FIG. 22, FIG. 23, and FIG. 24 may desirably display a message "the communication system is being switched".

The image of the conference-displaying screen 602, which is taken in by the image acquiring unit 23, is not necessarily a still image, and may be a moving image. In a case of taking in the moving image, for example, 10 to 20 seconds of the latest images of the conference-displaying screen 602 are always stored, and such a stored moving image is displayed while the communication PF is being switched. In the case of the moving image, users are able to understand that a trouble is not occurring at least in the transmission terminal 10.

Example 4

In the present example, a transmission terminal 10 for displaying a switching phase of a communication PF on the switching screen 601 will be described.

Note that in the present example, a description will be given using a functional block diagram same as the diagram of FIG. 9. However, functions of the transmission terminals 10 to be described in the present example are different from the functions themselves that have been described in Example 1.

In a switching image setting management DB 1002 in the present example, conditions for selecting a switching image depending on the switching phase of the communication PF are stored.

TABLE 13

(SWITCHING IMAGE SETTING MANAGEMENT TABLE)

| MANAGEMENT NUMBER | SWITCHING PHASE | SWITCHING IMAGE NUMBER |
|---|---|---|
| c_001 | PHASE 1 | i_001 |
| c_002 | PHASE 2 | i_002 |
| c_003 | PHASE 3 | i_003 |
| c_004 | PHASE 4 | i_004 |
| ... | ... | ... |

Table 13 is one example of a switching image setting management table in the present example. In the switching image setting management table of Table 13, a switching phase and a switching image number are registered in relation to a management number. The switching image determining unit 21 is capable of reading the switching image number depending on the switching phase.

Figure 25:
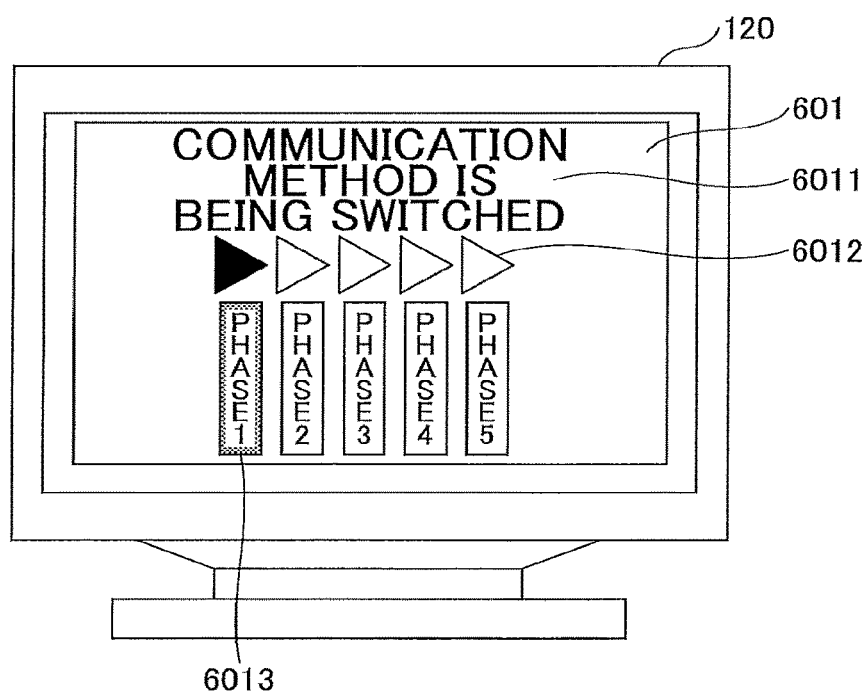
FIG. 25 is a view illustrating one example of the switching screen.
Figure 26:
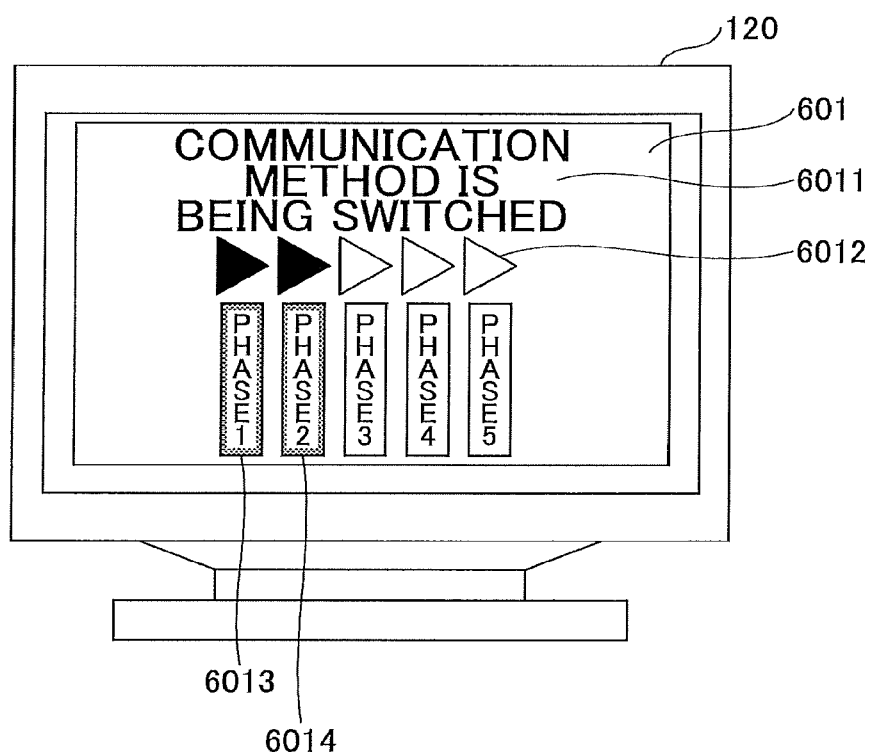
FIG. 26 is a view illustrating one example of the switching screen.

FIG. 25 and FIG. 26 are views illustrating examples of a switching screen 601. On the switching screen 601 of FIG. 25 and FIG. 26, a phase 1 to a phase 5 are displayed below the icons 6012 indicating that the switching is proceeding. In FIG. 25, together with the icons 6012, one of which is a colored portion, an indication 6013 for the phase 1 is highlighted. In FIG. 26, with color portions of two icons 6012, the phase 1 and an indication 6014 for the phase 2 are highlighted. According to such a switching screen 601, users easily understand how the respective phases in all the phases of the switching process of the communication PF are proceeding.

The switching image determining unit 21 in the present example acquires information about the switching phase of the communication PF from the transmission management system 50 (one example of an acquiring unit). For example, the phase 1 indicates a state where switching start notices to all terminals are completed. The phase 2 indicates a state where the switching of the transmission management system 50 is prepared, the phase 3 indicates a state where a relay apparatus 30 is determined, the phase 4 indicates a state where all transmission terminals 10 have switched the communication PF, and the phase 5 indicates a state where sessions are established among all transmission terminals.

The switching image determining unit 21 determines a switching image with reference to the switching image setting management table, according to the information about the switching phase acquired from the transmission management system 50. Note that the indications 6013 and 6014 of the phase 1 to the phase 5 in the switching image in FIG. 25 and FIG. 26 may remain unchanged, but the letters of the phase 1 to the phase 5 may be desirably variable according to the switching process performed by the transmission management system 50. A creator of a switching image may write appropriate indications in the switching image beforehand. Accordingly, users easily understand the switching state of the communication PF.

Additionally, as the switching phase, the number of the transmission terminals 10, which have established sessions, may be used. The transmission management system 50 informs the transmission terminal 10 whenever a session is established. The switching image determining unit 21 of the transmission terminal 10 determines the switching image depending on the number of transmission terminals 10, which have established sessions. Therefore, on the switching screen 601 in this case, an indication that "the first session is established", an indication that "the second session established", and the like are gradually increasing. In addition to these indications, the number of all sites may be desirably indicated together.

Note that the switching image does not necessarily include the indications 6013 and 6014 in the phase 1 to the phase 5. On the switching image in Examples 1 to 3, the indications 6013 and 6014 in the phase 1 to the phase 5 may be superimposed for display. That is, the display controlling unit 12 superimposes the phase in the switching that has been informed by the transmission management system 50 on the switching screen 601, and displays the superimposed switching screen 601.

Therefore, in the present example, the transmission terminal 10 communicates with the transmission management system 50 while the communication PF is being switched, and thus becomes capable of displaying the phase information indicating to what state the switching has proceeded, on the switching screen 601.

Other Preferred Application Examples

The embodiments for carrying out the present application have been described in Examples, but the present application is not limited to such Examples. Within the scope that does not deviate from subject matters of the present application, various types of modification and substitutions are applicable.

In the configuration example of FIG. 9 illustrated in the above-mentioned Examples, components are divided according to the substantial functionality to facilitate understanding of the processes of the transmission terminals 10 and the transmission management system 50. The present disclosure should not be limited by the way of dividing the process units or its names. The processes of the transmission terminal 10 and the transmission management system 50 can be divided into more process units according to the process content. Additionally, each of the processes can be divided so that a single process unit includes much more processes.

In the above-described Examples 1 to 4, the description has been given of the case where the transmission terminal 10 includes the switching image management DB 1001, the switching image setting management DB 1002, and the switching history management DB 1003. However, transmission management system 50 may include at least one of the switching image management DB 1001, the switching image setting management DB 1002, and the switching history management DB 1003. In such a case, to a transmission terminal 10 that has logged in the transmission management system 50, for example, the switching image management DB 1001, the switching image setting management DB 1002, and the switching history management DB 1003 are transmitted.

Further, in the above-described Examples 1 to 4, the switching image determining unit 21 of the transmission terminal 10 determines a switching image, but the transmission management system 50 may determine the switching image. In such a case, the transmission management system 50 can determine the switching image for every transmission terminal 10, according to the network bandwidth and the number of conference-participating sites, and can determine the same switching image for all transmission terminals 10. Also in this case, one of the transmission terminals 10 or the transmission management system 50 may include the switching image management DB 1001. In the case of the transmission management system 50, the transmission management system 50 can transmit the switching image that the transmission management system 50 has determined, to the transmission terminals 10.

Additionally, in the above-described Examples 1 to 4, the description has been given of the case where the transmission terminal 10 displays the switching screen 601, but the mobile terminal 20 is also capable of displaying the switching screen 601 in a similar manner.

Additionally, in the above-described Examples 1 to 4, the communication PF is switched according to the number of sites, but the trigger for changing the communication PF is not limited to this. The communication PF can be switched according to a change in an available bandwidth, depending on whether the transmission terminal 10 and the mobile terminal 20 use a mobile communication network, whether all transmission terminals 10 are coupled to an in-house LAN, or, whether all transmission terminals 10 are coupled by wire.

Additionally, in the above-described Examples 1 to 4, the description has been given of the case of the terminals designed for a teleconference as one example of the transmission terminals 10, but the present application is not limited to this. Telephone terminals such as IP (Internet Protocol) telephones or Internet telephones may be applicable. Additionally, smartphones, cellular phones, car navigation terminals, wearable computers, cameras, electronic whiteboards, gaming machines, or industrial apparatuses each provided with a communication function may be applicable. The wearable computers include wrist watches or Head Mount Displays, for example. Additionally, the industrial apparatuses include office apparatuses such as MFPs (Multifunction Peripheral/Printer/Product), medical apparatuses such as endoscopes, and agricultural apparatuses such as tillers.

Note that above-mentioned Examples are preferred examples for carrying out the present application, without being limited to them. Within the scope that does not deviate from subject matters of the present application, various types of modifications and substitutions can be added.

For example, in the above-described Examples 1 to 4, the description has been given of the case where tablets (tablets) wrapped by a PTP sheet were drugs, but are not limited to, may be food products or the like.

The present application is based on and claims the benefit of priority of Japanese Priority Applications No. 2015-055302 filed on Mar. 18, 2015, entire contents of which are hereby incorporated by reference.

REFERENCE SIGNS LIST

1 transmission system
10 transmission terminal
18 switching image determination parameter measuring unit
20 mobile terminal
21 switching image determining unit
22 switching history processing unit 23 image acquiring unit
30 relay apparatus
50 transmission management system

What is claimed is:

1. An information processing apparatus for communicating with another information processing apparatus at a different site by using at least one of a plurality of communication platforms, the information processing apparatus comprising:
　a receiver configured to receive a transmission image transmitted from the another information processing apparatus at the different site;
　processing circuitry configured to display, on a display, the transmission image received by the receiver; and
　an image memory to store an image to be displayed,
　wherein the processing circuitry is further configured to read the image to be displayed from the image memory,
　for at least a certain period while one of the communication platforms is being switched to another one, the processing circuitry is configured to display, in place of the transmission image, the read image,
　the image memory stores a plurality of images to be displayed,
　the processing circuitry is further configured to
　　detect a communication situation with the another information processing apparatus at the different site,
　　acquire, from a screen identification information memory that stores identification information of the image to be displayed in association with the communication situation, the identification information corresponding to the detected communication situation, and
　　read, from the image memory, the image to be displayed corresponding to the acquired identification information, and
　for at least the certain period while the one of the plurality of communication platforms is being switched to the another one, the processing circuitry displays, on the display, the image to be displayed.

2. The information processing apparatus according to claim 1, wherein the processing circuitry is further configured to
　detect the communication situation correlating to a period needed for switching the one of the plurality of communication platforms, and
　acquire, from the screen identification information memory, the identification information of a moving image or a still image as the image to be displayed, based on the communication situation that has been detected by the processing circuitry.

3. The information processing apparatus according to claim 2, wherein the processing circuitry is further configured to
　detect at least one of a communication bandwidth used for communicating with the another information processing apparatus in the different site and a number of sites, and
　acquire, from the screen identification information memory, the identification information in relation to one of the communication bandwidth or the number of sites.

4. The information processing apparatus according to claim 1,
　wherein the processing circuitry is further configured to
　　record, in a switching period memory, a switching period taken for switching the one of the plurality of communication platforms;
　　estimate the switching period needed for switching the one of the plurality of communication platforms, based on a past switching period stored in the switching period memory;
　　acquire, from a screen identification information memory that stores the identification information of the image to be displayed in association with the switching period, the identification information corresponding to the estimated switching period, and
　　read the image to be displayed corresponding to the acquired identification information, and display the image to be displayed on the display for at least the certain period while the one of the plurality of communication platforms is being switched.

5. The information processing apparatus according to claim 4, wherein the processing circuitry is further configured to detect a communication situation with the another information processing apparatus at the different site,
　the screen identification information memory stores the identification information of the image to be displayed in association with the switching period and the communication situation, and
　the processing circuitry is further configured to acquire the identification information corresponding to the estimated switching period and the detected communication situation.

6. The information processing apparatus according to claim 4, wherein the processing circuitry is further configured to
　detect a communication situation with the another information processing apparatus at the different site,
　the record the switching period taken for switching the communication platform in the switching period memory corresponding to the detected communication situation,
　estimate the switching period needed for switching the communication platform, based on the detected switching period, the switching period being stored in the switching period memory in association with the communication situation, and
　acquire, from the screen identification information memory, the identification information corresponding to the estimated switching period.

7. The information processing apparatus according to claim 1, wherein the image to be displayed includes information indicating that the communication platform is being switched.

8. The information processing apparatus according to claim 1,
　further comprising a camera configured to capture the transmission image displayed on the display,
　wherein the processing circuitry is further configured to display the transmission image captured by the camera, for at least the certain period while the one of the plurality of communication platforms is being switched.

9. The information processing apparatus according to claim 8,
　wherein the camera captures a plurality of transmission images before the one of the plurality of communication platforms starts to be switched, and
　wherein for at least the certain period while the one of the communication platform is being switched, the processing circuitry, in place of the transmission image, is configured to display the plurality of transmission images that have been captured by the camera on the display.

10. The information processing apparatus according to claim 1,
wherein the processing circuitry is further configured to acquire phase information in switching the one of the plurality of communication platforms, from a switching apparatus configured to switch the one of the plurality of communication platforms, and
wherein the processing circuitry is further configured to display, on the display, the acquired phase information together with the image to be displayed.

11. The information processing apparatus according to claim 1, wherein the at least one of the plurality of communication platforms is switched to a different transmission method of transmitting image data.

12. A screen displaying method to be performed by an information processing apparatus for communicating with another information processing apparatus at a different site by using at least one of a plurality of communication platforms, the screen displaying method comprising:
receiving, by a receiver, a transmission image transmitted from the another information processing apparatus at the different site;
displaying, on a display, the transmission image received by the receiver; and
reading, by processing circuitry, an image to be displayed from an image memory storing the image to be displayed,
wherein for at least a certain period while one of the communication platforms is being switched to another one, the processing circuitry is configured to display, in place of the transmission image, the read image to be displayed,
the image memory stores a plurality of images to be displayed, and
the method further includes
detecting communication situation with the another information processing apparatus at the different site,
acquiring, from a screen identification information memory that stores identification information of the image to be displayed in association with the communication situation, the identification information corresponding to the detected communication situation,
reading, from the image memory, the image to be displayed corresponding to the acquired identification information, and
for at least the certain period while the one of the plurality of communication platforms is being switched to the another one, displaying, on the display, the image to be displayed.

13. A transmission system, comprising:
a first information processing apparatus for communicating with another information processing apparatus at a different site by using at least one of a plurality of communication platforms;
a second information processing apparatus configured to switch the communication platform;
a receiver configured to receive a transmission image transmitted from the another information processing apparatus at the different site;
processing circuitry configured to display, on a display, the transmission image received by the receiver;
an image memory to store an image to be displayed,
wherein the processing circuitry is further configured to read the image to be displayed from the image memory,
for at least a certain period while one of the communication platforms is being switched to another one, the processing circuitry is configured to display, in place of the transmission image, the read image to be displayed,
the image memory stores a plurality of images to be displayed,
the processing circuitry is further configured to
detect a communication situation with the another information processing apparatus at the different site,
acquire, from a screen identification information memory that stores identification information of the image to be displayed in association with the communication situation, the identification information corresponding to the detected communication situation, and
read from the image memory, the image to be displayed corresponding to the acquired identification information, and
for at least the certain period while the one of the plurality of communication platforms is being switched to the another one, the processing circuitry displays, on the display, the image to be displayed.

* * * * *